(12) United States Patent
Jiang et al.

(10) Patent No.: US 8,049,989 B2
(45) Date of Patent: Nov. 1, 2011

(54) MAGNETIC HEAD FOR PERPENDICULAR RECORDING HAVING STEPPED WRAP AROUND SHIELD WITH INDEPENDENT CONTROL OF WRITE POLE TRACK WIDTH AND FLARE POINT DIMENSIONS

(75) Inventors: Ming Jiang, San Jose, CA (US); Changqing Shi, Mountain View, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 978 days.

(21) Appl. No.: 12/005,557

(22) Filed: Dec. 26, 2007

(65) Prior Publication Data

US 2009/0168236 A1 Jul. 2, 2009

(51) Int. Cl.
*G11B 5/147* (2006.01)
(52) U.S. Cl. .................................................. 360/125.09
(58) Field of Classification Search ............. 360/125.09, 360/125.08, 125.07, 125.06, 125.38, 125.12, 360/125.13, 125.1, 125.25, 125.11, 317
See application file for complete search history.

(56) References Cited

U.S. PATENT DOCUMENTS

| 5,486,967 | A | 1/1996 | Tanaka et al. |
|---|---|---|---|
| 6,687,085 | B2 | 2/2004 | Minor et al. |
| 6,771,464 | B2 | 8/2004 | Minor |
| 2005/0162778 | A1 | 7/2005 | Kimura et al. |
| 2005/0280939 | A1 | 12/2005 | Sasaki et al. |
| 2006/0002021 | A1 | 1/2006 | Li et al. |
| 2006/0092567 | A1 | 5/2006 | Guan |
| 2006/0103980 | A1 | 5/2006 | Sasaki et al. |
| 2006/0119981 | A1 | 6/2006 | Li et al. |
| 2006/0139802 | A1 | 6/2006 | Sasaki et al. |
| 2006/0276039 | A1 | 12/2006 | Li et al. |
| 2007/0014048 | A1 | 1/2007 | Sasaki et al. |
| 2010/0126001 | A1* | 5/2010 | Bonhote et al. ............ 29/603.07 |
| 2010/0128392 | A1* | 5/2010 | Bonhote et al. ........... 360/125.03 |

FOREIGN PATENT DOCUMENTS

| JP | 60059517 | 4/1985 |
|---|---|---|
| JP | 3132909 | 6/1991 |
| JP | 7201988 | 8/1995 |
| JP | 2003317212 | 11/2003 |

OTHER PUBLICATIONS

Bia et al, Detached Pole Tip Design of Perpendicular Write Heads for High Data Rate Recording, IEEE Trans on Magnetics, Sep. 2002, 2240-42, vol. 38, No. 5.
Bia et al, Stiched pole tip design with enhanced head field for perpendicular recording, Journal of Applied Phys, May 13, 2002, 6540-42, vol. 93, No. 10.

* cited by examiner

*Primary Examiner* — Allen Cao
(74) *Attorney, Agent, or Firm* — D'Arcy H. Lorimer; Lorimer Labs

(57) ABSTRACT

Methods and structures for the fabrication of a thin film, perpendicular recording write head are disclosed. The fabrication involves the deposition of two different oxide layers which have mutually high etch selectivities. This characteristic allows a write pole structure to be built wherein the track width is independent of the location of the flare point. The process also produces a structure wherein the throat height of the shield is self aligned to the location of the flare point of the write pole.

10 Claims, 27 Drawing Sheets

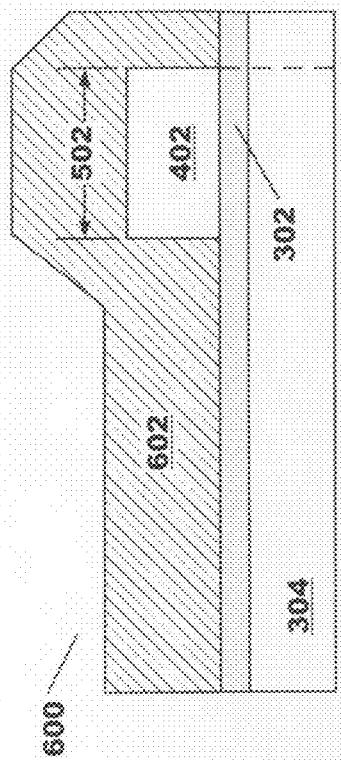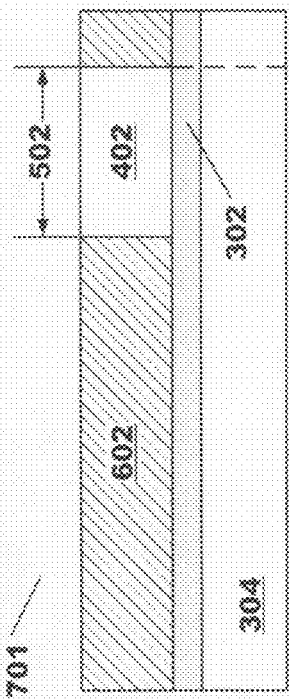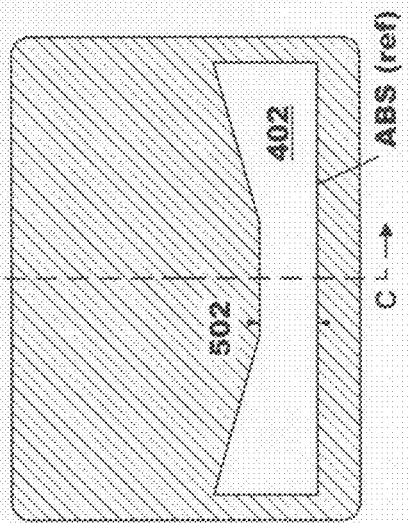

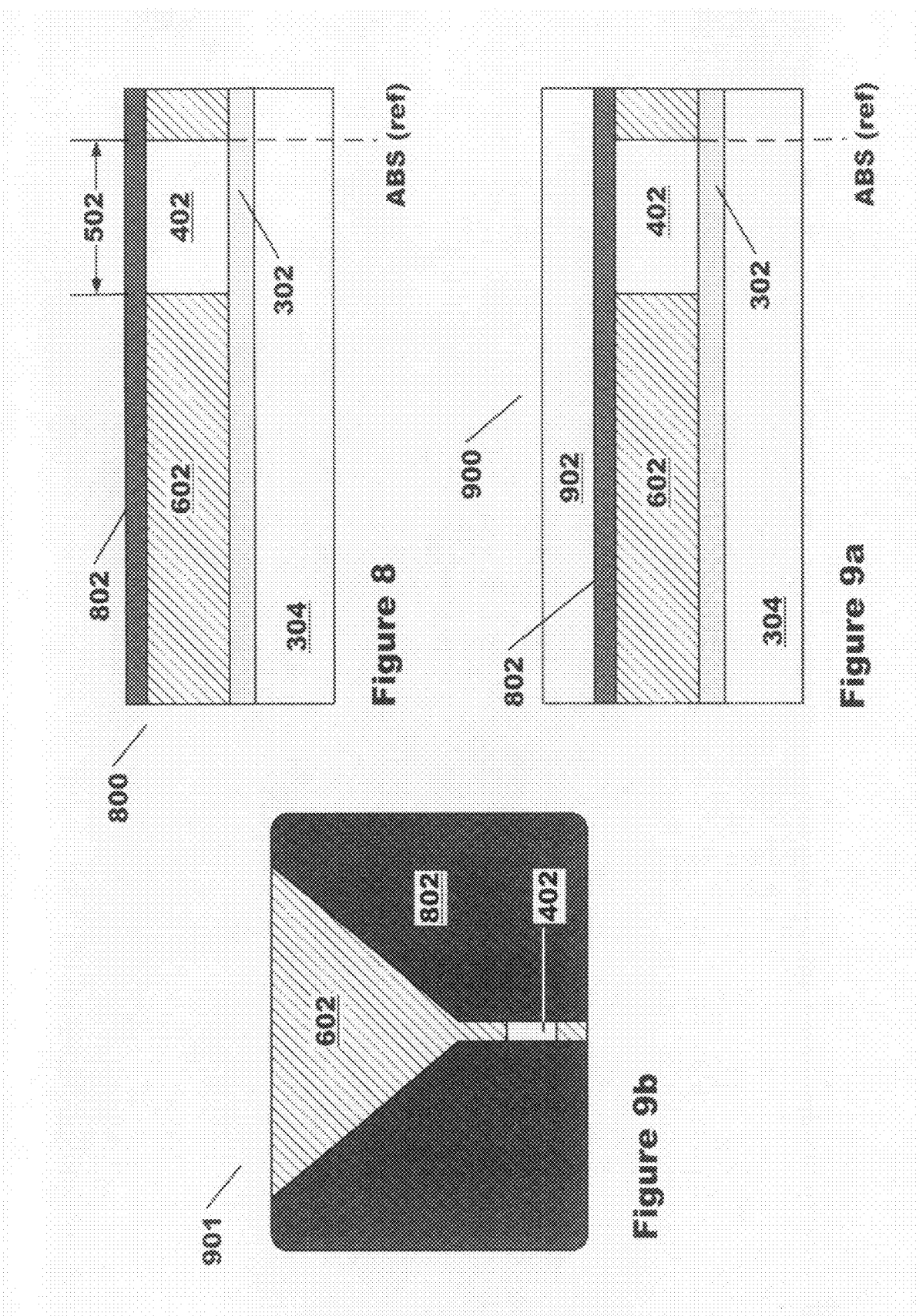

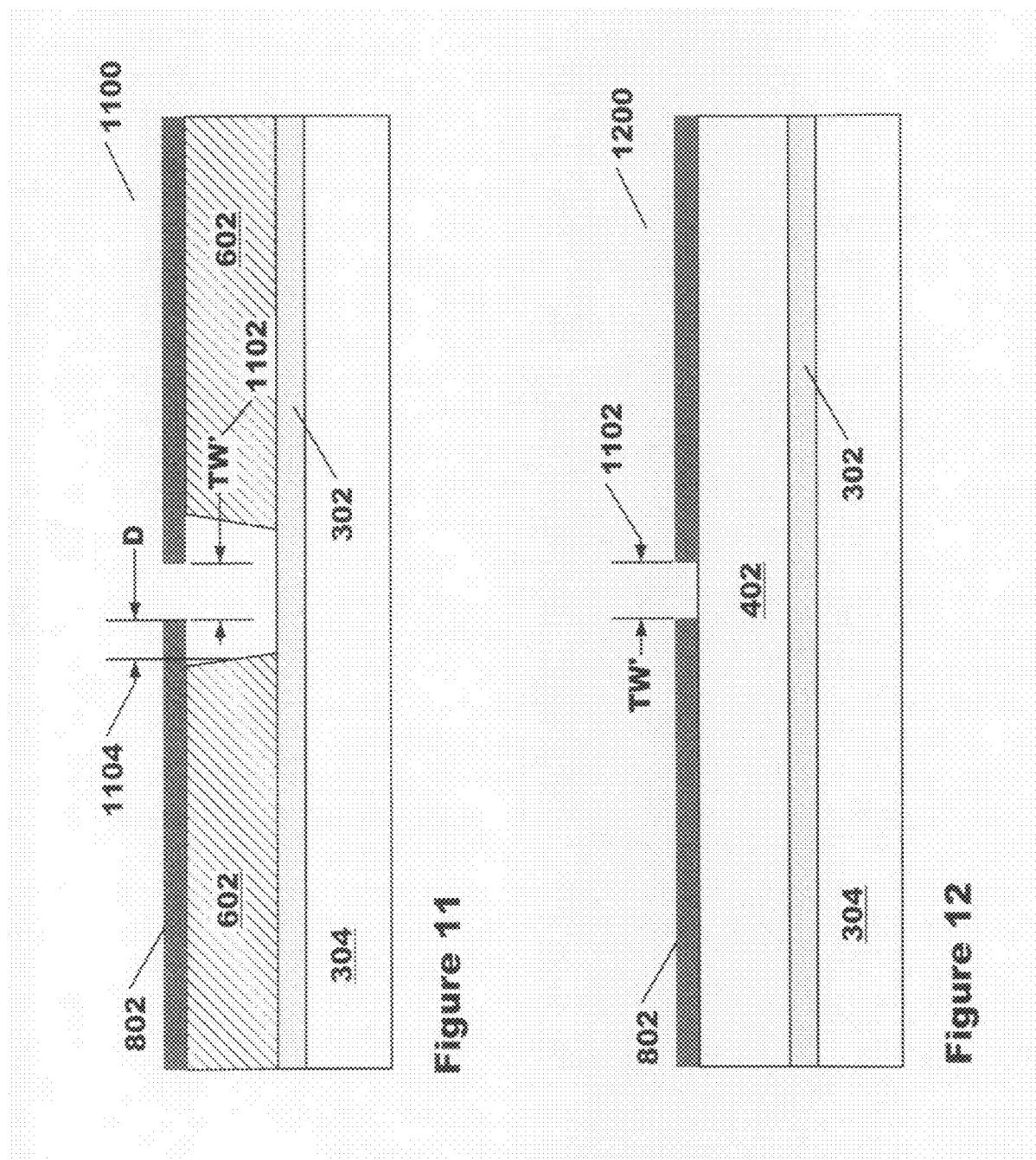

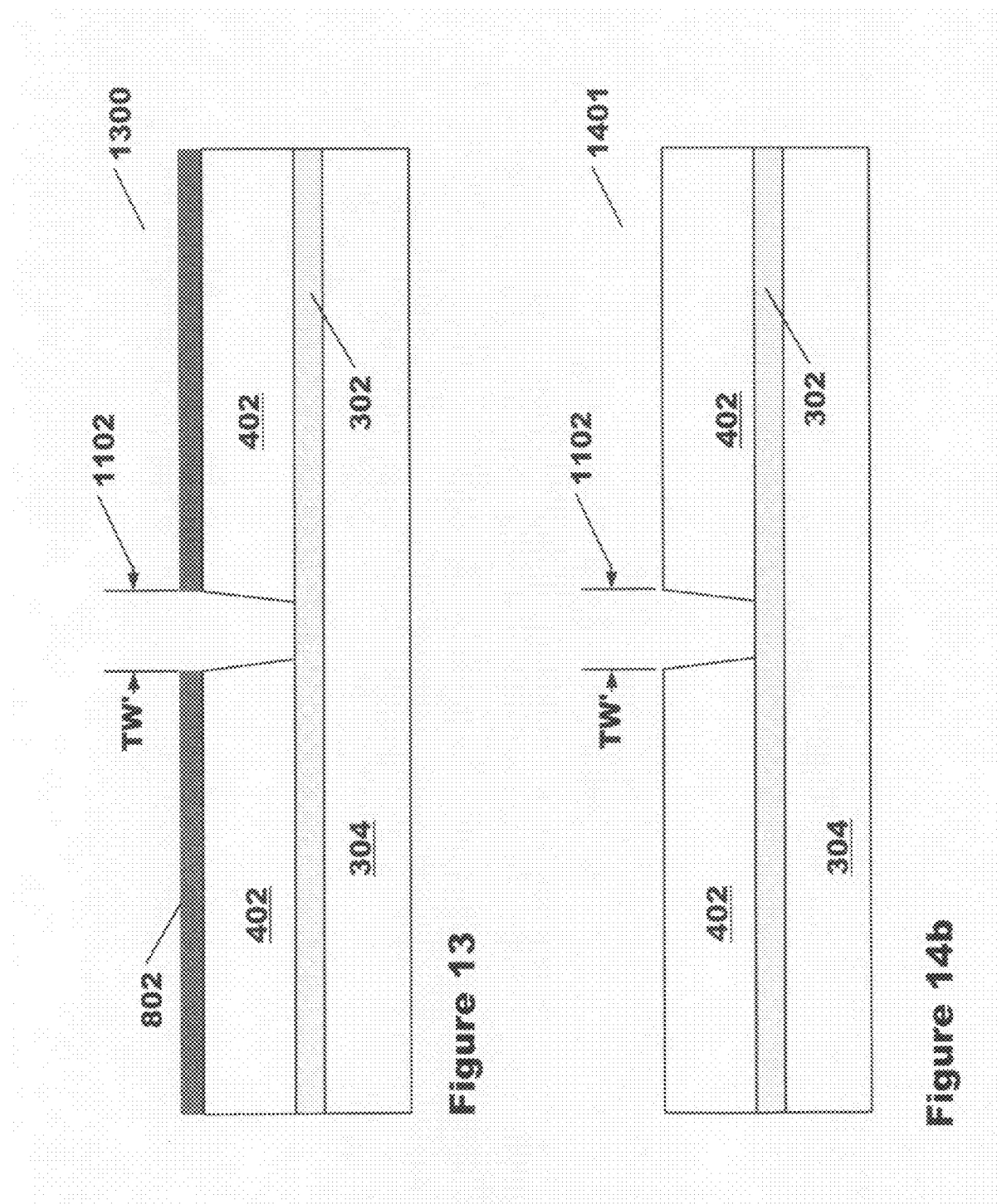

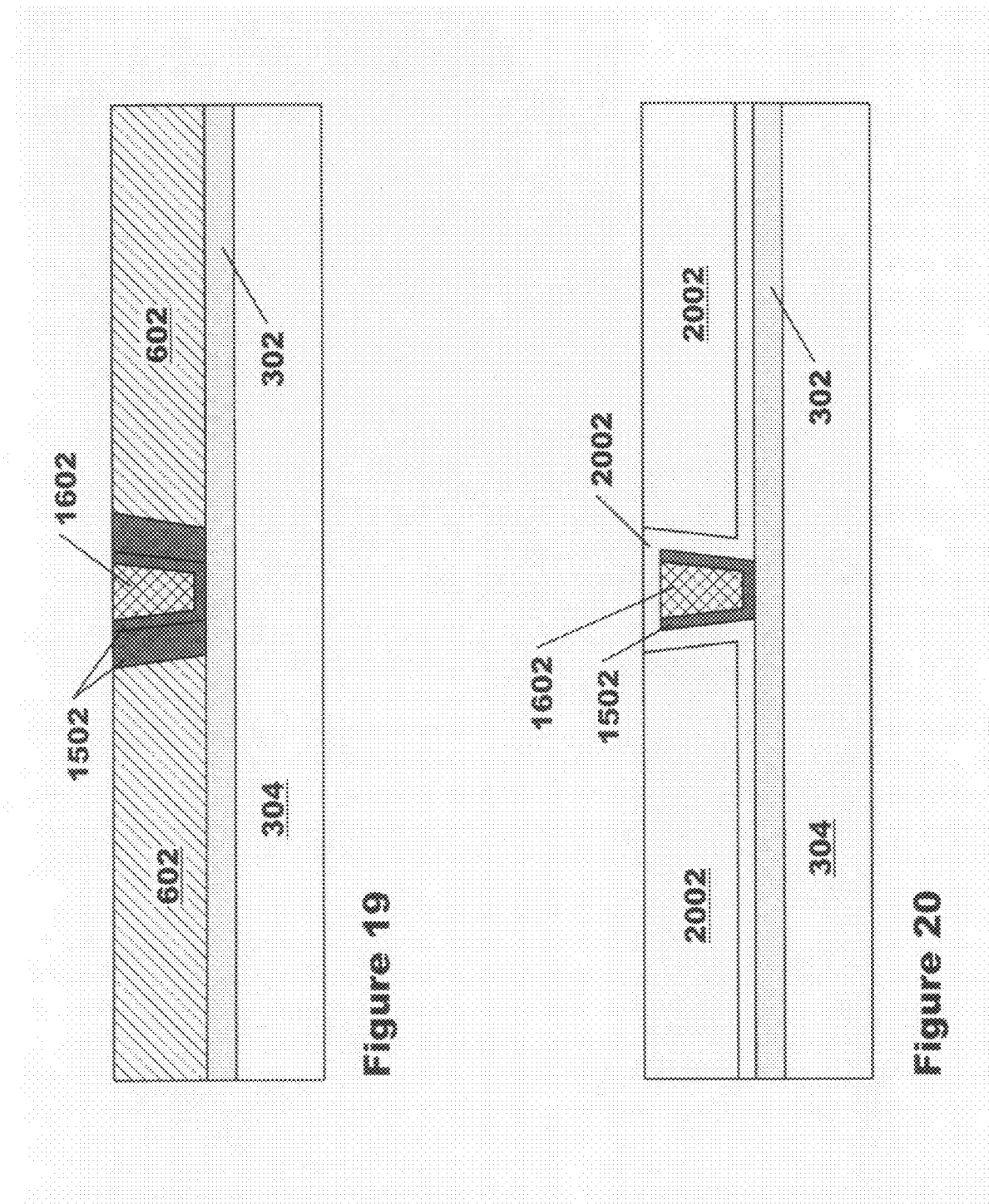

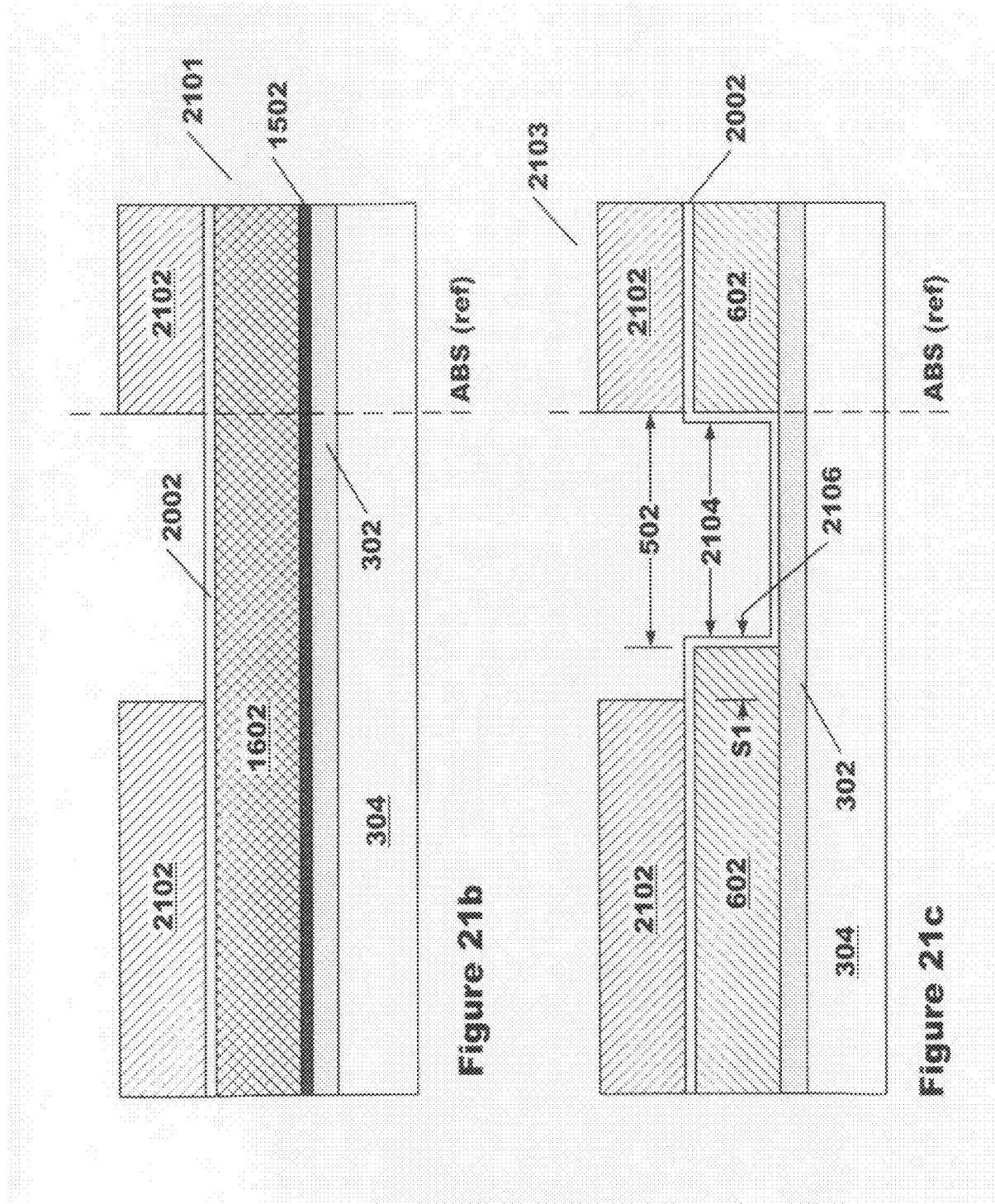

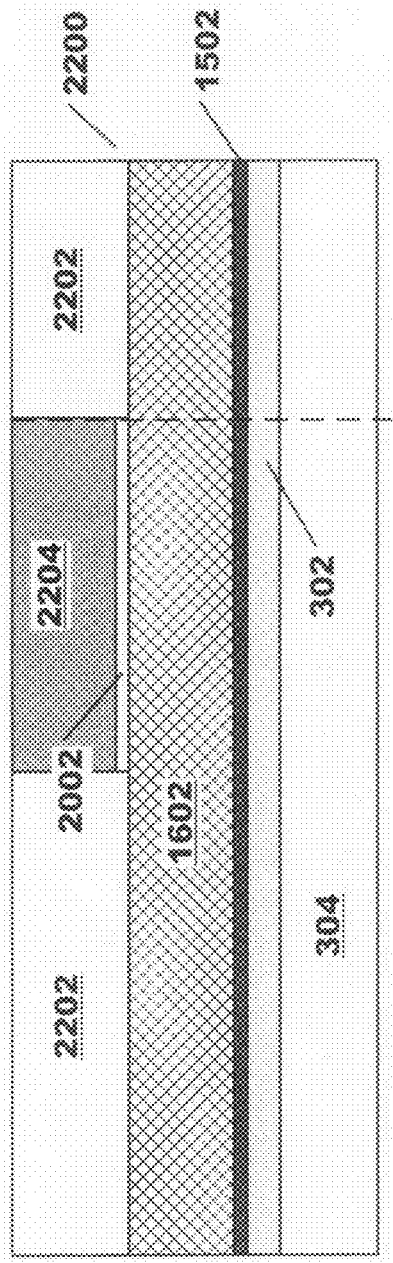
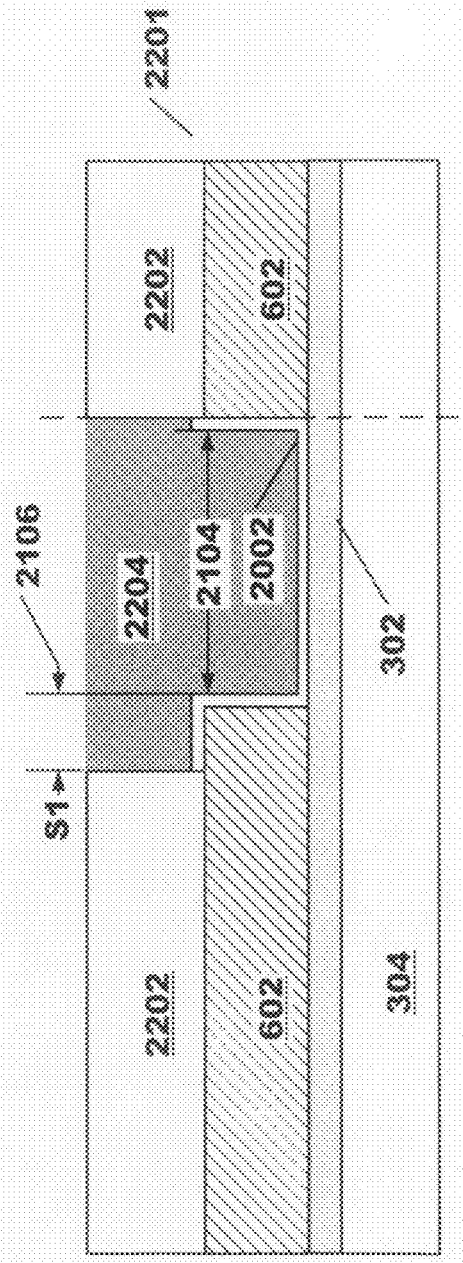
Figure 22a
Figure 22b

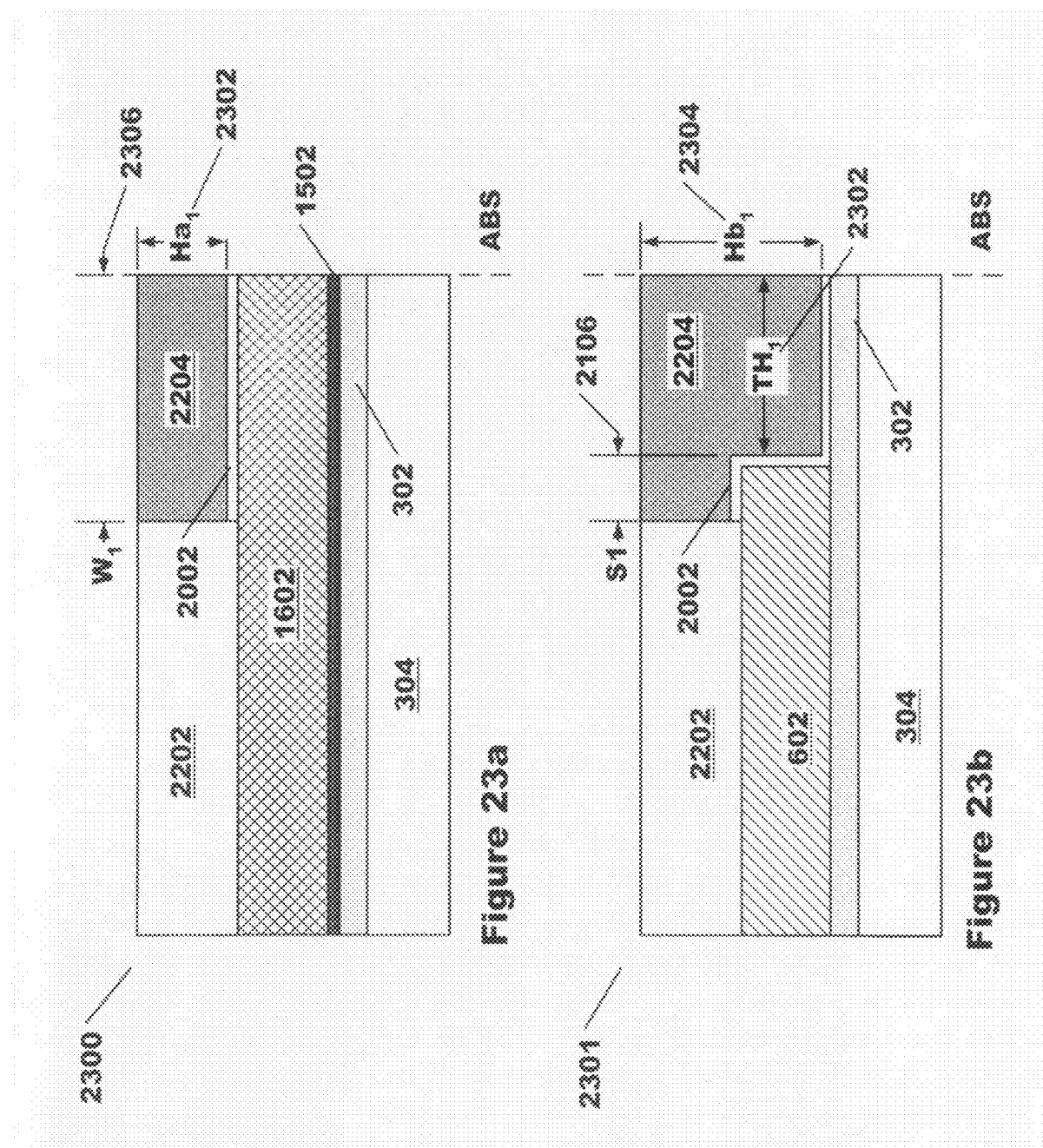

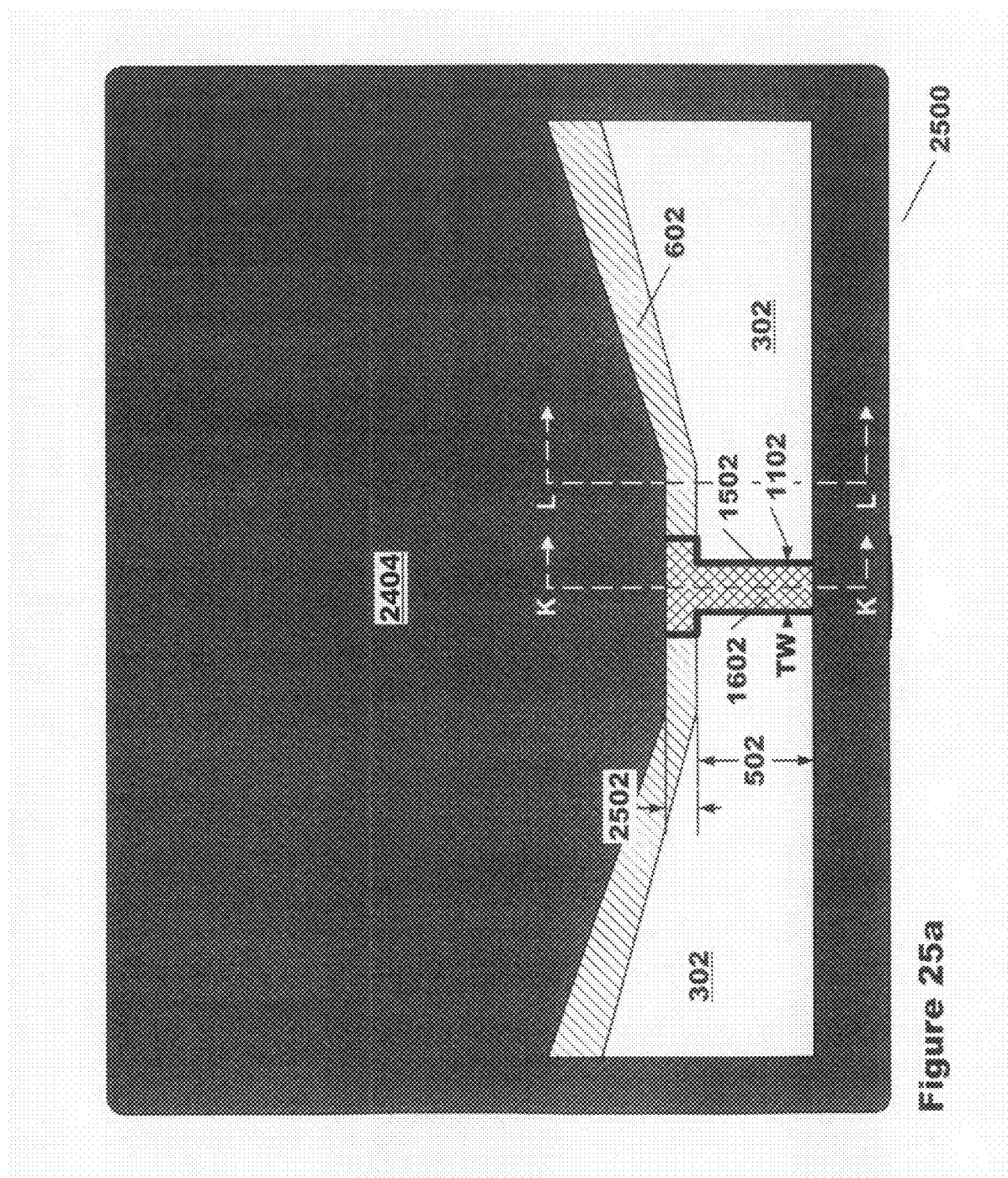

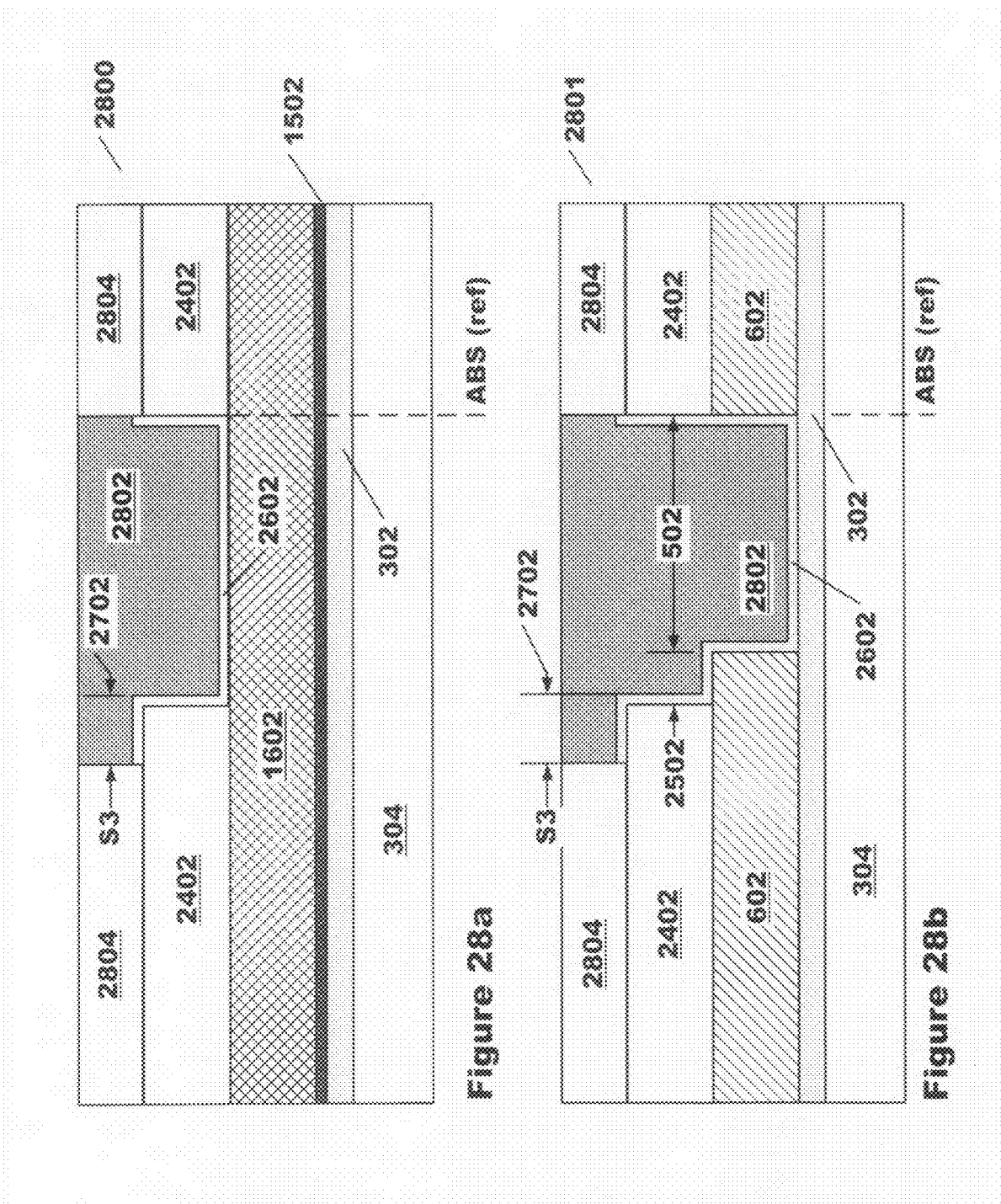

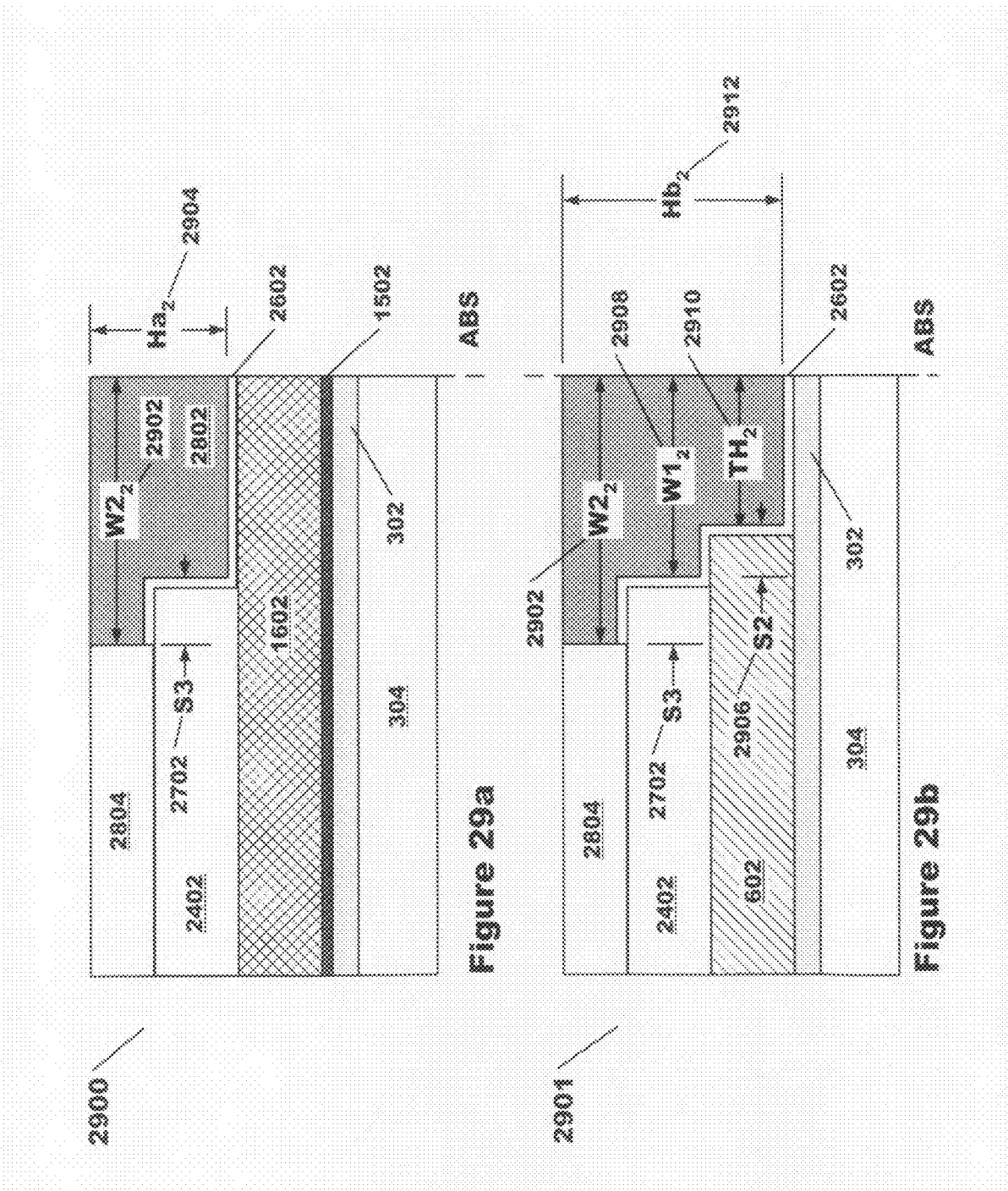

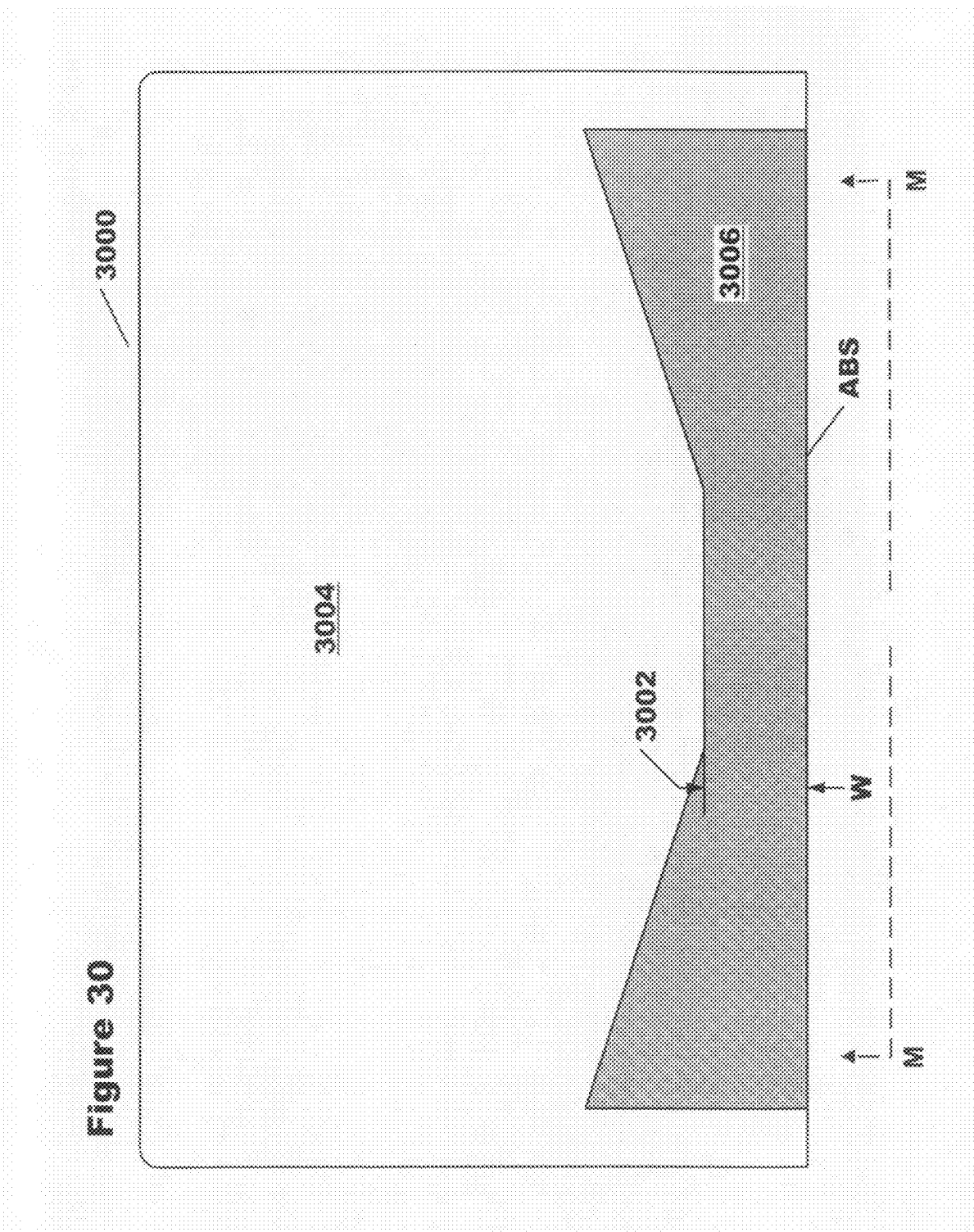

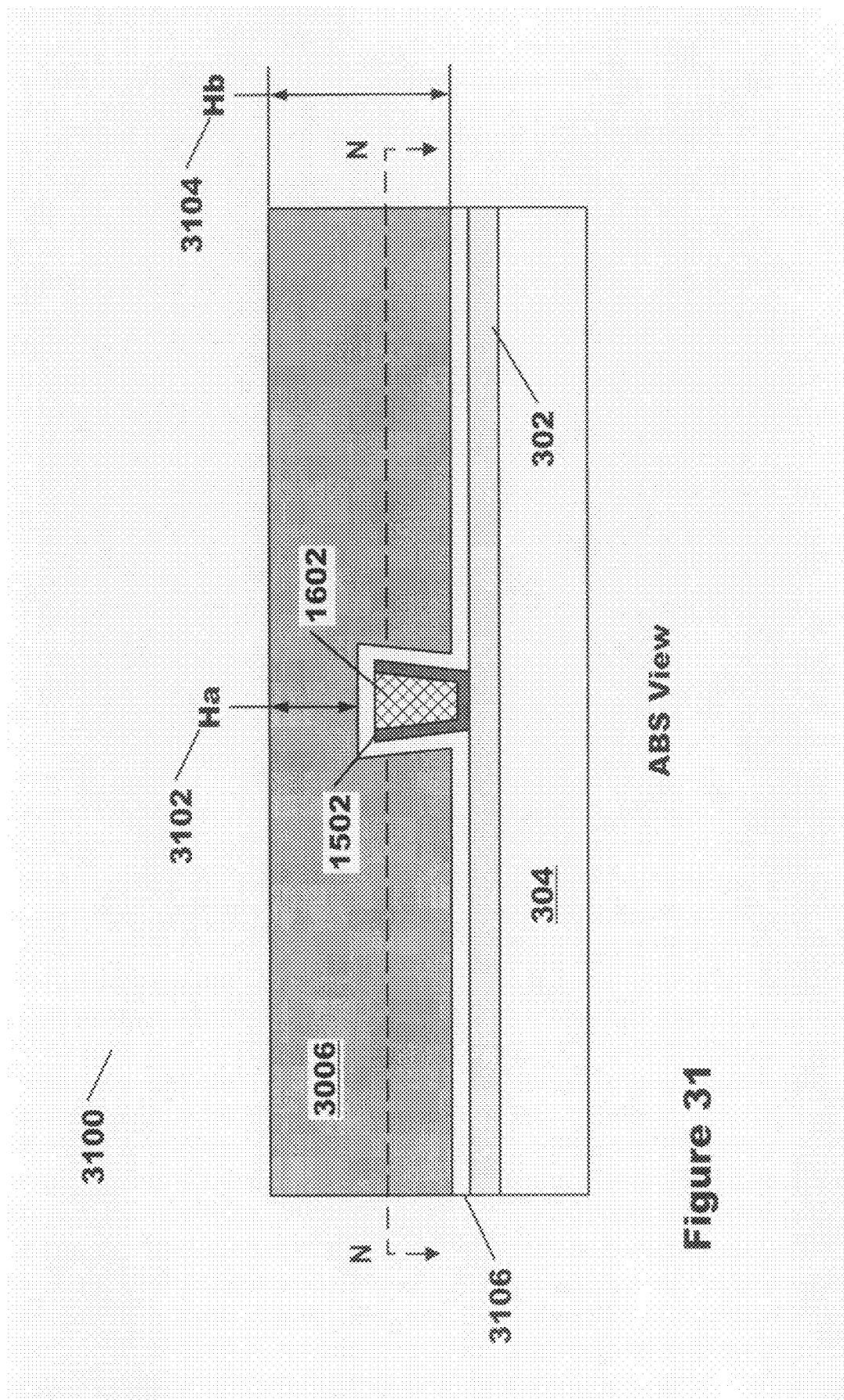

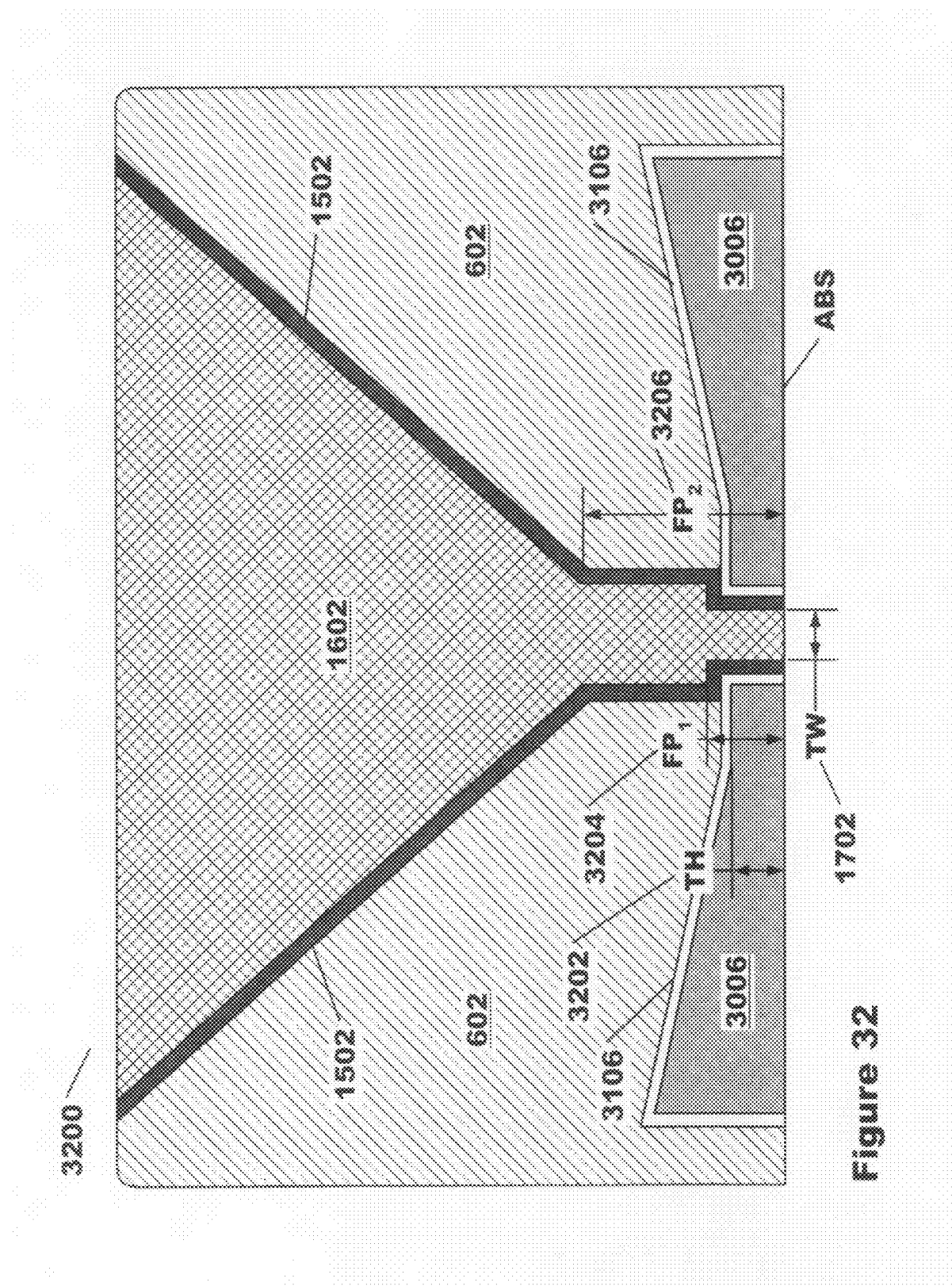

MAGNETIC HEAD FOR PERPENDICULAR RECORDING HAVING STEPPED WRAP AROUND SHIELD WITH INDEPENDENT CONTROL OF WRITE POLE TRACK WIDTH AND FLARE POINT DIMENSIONS

BACKGROUND OF THE INVENTION

1. Field of the Invention

This invention relates to structures and methods for fabricating thin film magnetic write heads. More specifically, the invention relates to structures and methods for fabricating a thin film write head for perpendicular recording having independent control of track width, flare point, and a wrap around shield throat height which is self aligned to the flare point of the write pole. The methods and structure also provide for stepped wrap around shields wherein the thickness or depth (from the ABS) of the wrap around shield increases in the region above the write pole.

2. Description of the Related Art

As areal densities for magnetic storage hard disk drives continue to increase, the critical dimensions for thin film write heads are driven to smaller levels. For future designs, track widths (TW), flare points (FP), and wrap around shield throat heights (TH) will be on the order of 60 nm. Holding these dimensions provides a significant challenge for conventional processing, as will be illustrated in FIG. 1. FIG. 1 (Prior Art) is a partial plan view 100 of a typical thin film perpendicular write pole 212. Write pole 212 is typically imbedded in oxide layer 112, and is deposited after imaging the shape of the pole and etching oxide layer 112. Alternatively, write pole layer 212 can be blanket deposited, then imaged to define the final shape, etched or ion milled to define the pole, with areas around the pole subsequently filled with an oxide layer and both layers planarized. In either case, current imaging and etching processes can create errors with respect to the location of the flare point 102, since the position where the flare point is located by lithography $FP_d$ ref 104 will not be the actual location of the flare point $FP_a$ ref 106 subsequent to etching/milling of the pole material 212, or oxide layer within which the pole material is deposited. Errors can also be introduced with respect to the track width TW. The imaged track width $TW_d$ ref 108 may be larger or smaller than the actual value $TW_a$ ref 110. These errors also impact the location of the flare point. As dimensions are reduced, the location errors of the flare point can significantly impact the performance of the write head. Similar errors are introduced when locating and etching the cavities for the wrap around shield. The throat height, or the depth or thickness of the wrap around shield from the ABS, is critical to the performance of the write head. More particularly, the location of the rear of the wrap around shield relative to the flare point is critical, and is subject to significant errors when conventional lithography and etching processes are utilized to fabricate the shield. What is needed is a better process for producing perpendicular thin film write heads.

FIG. 2 (Prior Art) is a partial, cross sectional view of a typical thin film perpendicular write head 200. The head comprises shield layers 202, 204, shaping layer 210, coil structure 208, main pole 212, lower return pole layer 206, wrap around shield 214, and upper return pole layer 216. Alternatively, structure 214 may also be a trailing shield. Main pole 212 is typically deposited over spacer layer 112. Details of wrap around shields and trailing shields, as applied to perpendicular recording heads, can be found in, for example, US Patent Application Publications 2007/0146930, 2007/0115584, 2006/0174474, 2006/0044682, and 2007/0137027.

SUMMARY OF THE INVENTION

It is an object of the present invention to provide a thin film perpendicular magnetic head containing a write pole having a first flare point and a second flare point, the write pole having a first portion extending from an air bearing surface to the first flare point, the first portion having a constant first width, the write pole having a second portion extending from the first flare point to the second flare point, the second portion having a constant second width greater than the first width.

It is another object of the present invention to provide a method for making a thin film perpendicular magnetic head including depositing a first oxide layer and a second oxide layer on a surface, such that the first oxide layer and the second oxide layer share an interface boundary approximately perpendicular to the surface; depositing a mask layer over a first portion of the first oxide layer and over a first portion of the second oxide layer; creating an opening of in the mask layer, the opening exposing a second portion of the first oxide layer and a second portion of the second oxide layer, the opening extending across the interface boundary; isotropically etching, with a first process, the second portion of the second oxide layer to form a first trench; anisotropically etching, with a second process, the second portion of the first oxide layer, subsequent to isotropically etching the second oxide layer with the first process, to form a second trench, wherein the second portion of the first oxide layer is exposed to conditions of the first process, and the width of the first trench is greater than the width of the second trench; and, depositing a magnetic material in the first and second trenches to form at least a portion of a write pole.

BRIEF DESCRIPTION OF THE DRAWINGS

The present invention will be better understood when consideration is given to the following detailed description thereof. Such description makes reference to the annexed drawings, wherein:

FIG. 6 is a cross section view of FIG. 5b subsequent to the blanket deposition of oxide 2 in accordance with embodiments of the present invention;

FIG. 7a is a plan view of FIG. 6 subsequent to the planarization of oxide 2 in accordance with embodiments of the present invention;

FIG. 7b is a cross section view through section C-C of FIG. 7a in accordance with embodiments of the present invention;

FIG. 8 is a cross section view of FIG. 7b subsequent to the blanket deposition of an etch mask layer in accordance with embodiments of the present invention;

FIG. 9a is a cross section view of FIG. 8 subsequent to the blanket deposition of a photo resist layer in accordance with embodiments of the present invention;

FIG. 9b is a plan view of FIG. 9a subsequent to the patterning of mask layer 802 in accordance with embodiments of the present invention;

FIG. 11 is a cross section view through section D-D of FIG. 10 in accordance with embodiments of the present invention;

FIG. 12 is a cross section view through section E-E of FIG. 10 in accordance with embodiments of the present invention;

FIG. 13 is a cross section view of FIG. 12 subsequent to the etching of oxide 1 in accordance with embodiments of the present invention;

FIG. 14b is a cross section view through section G-G of FIG. 14a in accordance with embodiments of the present invention;

FIG. 19 is a cross section view through section H-H of FIG. 18 in accordance with a first embodiment of the present invention;

FIG. 20 is a cross section view of FIG. 19 subsequent to the blanket deposition of gap layer 2002 in accordance with a first embodiment of the present invention;

FIG. 21b is a cross section view through section H-H of FIG. 21a in accordance with a first embodiment of the present invention;

FIG. 21c is a cross section view through section J-J of FIG. 21a in accordance with a first embodiment of the present invention;

FIG. 22a,b are cross section views of FIG. 21b,c, respectively, subsequent to shield deposition in accordance with a first embodiment of the present invention;

FIGS. 23a,b are cross section views of FIGS. 22a,b, respectively, subsequent to lapping in accordance with a first embodiment of the present invention;

FIG. 25a is a plan view of FIG. 24 subsequent to the patterning of mask layer 2404 and removal of oxide 1 in accordance with a second embodiment of the present invention;

FIGS. 28a,b are cross section views of FIGS. 27a,b, respectively, subsequent to the deposition of shield layer 2802 and deposition of filler oxide 2804 in accordance with a second embodiment of the present invention;

FIG. 29a,b are cross section views of FIGS. 28a,b, respectively, subsequent to lapping in accordance with a second embodiment of the present invention;

FIG. 30 is a plan view of the finished structure of FIGS. 29a,b and 23a,b in accordance with embodiments of the present invention;

FIG. 31 is a cross section view through section M-M of FIG. 30 in accordance with embodiments of the present invention; and, FIG. 32 is a plan view through section N-N of FIG. 31 in accordance with embodiments of the present invention.

DETAILED DESCRIPTION OF THE PREFERRED EMBODIMENTS

Figure 1:
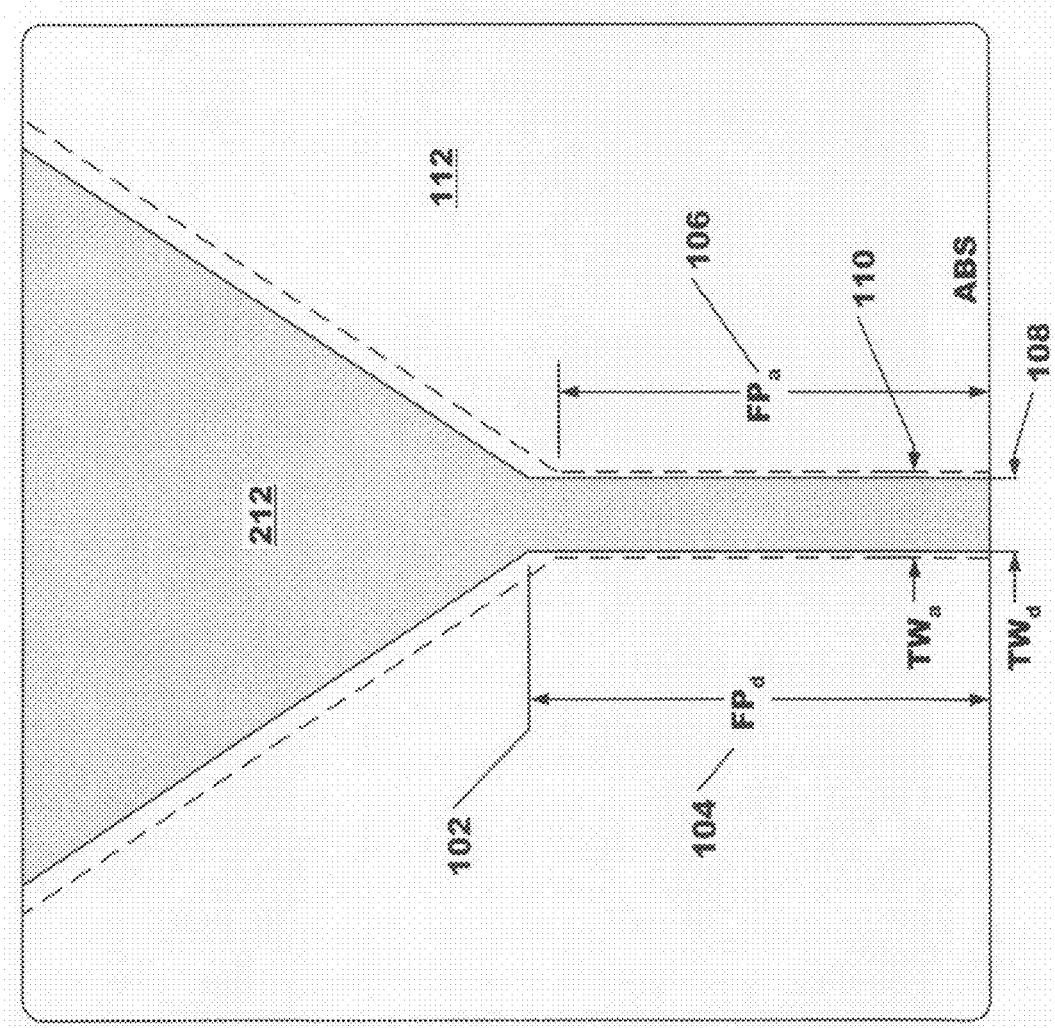
FIG. 1 (Prior Art) is a partial plan view of a typical thin film perpendicular write pole.
Figure 2:
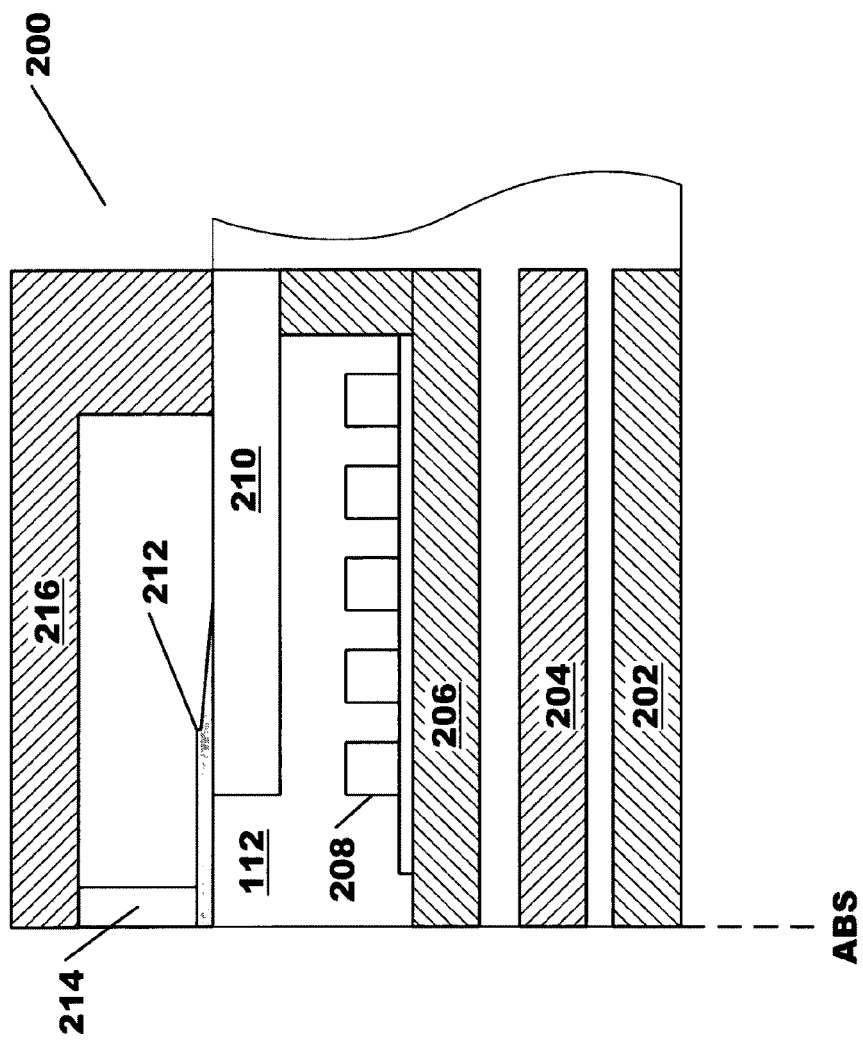
FIG. 2 (Prior Art) is a partial cross section view of a typical thin film perpendicular write head structure.

FIGS. 1 and 2 (Prior Art) have been discussed above in the Background section. With respect to subsequent figures, a first embodiment of the present invention is disclosed in FIGS. 3-23a,b. A second embodiment of the present invention is disclosed in FIGS. 3-17, and 24-29a,b. FIGS. 30-32 apply to both first and second embodiments, as do FIGS. 3-17. Details of the embodiments are best described via a sequential process of construction.

Figure 3A:
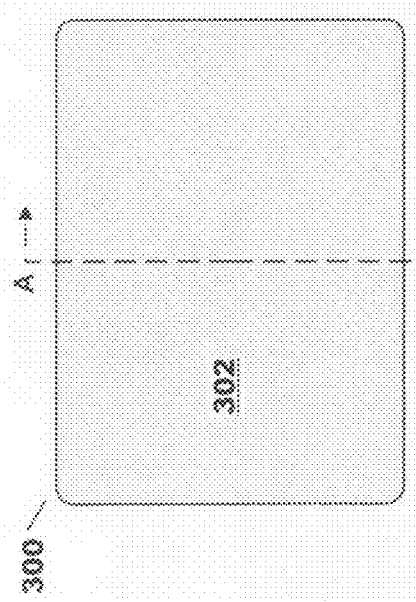
FIG. 3a is a partial plan view of a substrate subsequent to the deposition of a blanket etch stop layer in accordance with embodiments of the present invention.
Figure 3B:
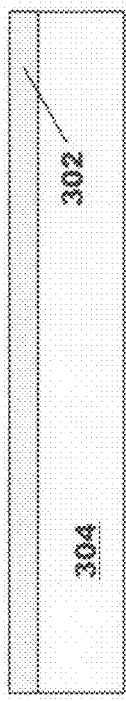
FIG. 3b is a cross section view through section A-A of FIG. 3a in accordance with embodiments of the present invention.

FIG. 3a is a partial plan view 300 of a substrate subsequent to the deposition of a blanket etch stop layer 302 in accordance with embodiments of the present invention. FIG. 3b is a cross section view 301 through section A-A of FIG. 3a. Support layer 304 is typically a spacer layer comprising a dielectric material similar to layer 112 of FIG. 2 (Prior Art).

Figure 4:
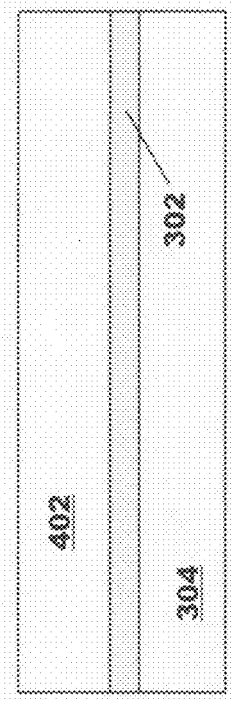
FIG. 4 is a cross section view of FIG. 3b subsequent to the deposition of a blanket layer of oxide 1 in accordance with embodiments of the present invention.

FIG. 4 is a cross section view 400 of FIG. 3b subsequent to the deposition of a blanket layer 402 of oxide 1 in accordance with embodiments of the present invention. A photo resist layer is then deposited over oxide 1 layer 402 (not shown), imaged, and developed in accordance with processes well known to those skilled in the art. Portions of oxide 1 layer 402 are then etched to stop layer 302, the resultant structure is shown in FIGS. 5a,b.

Figure 5A:
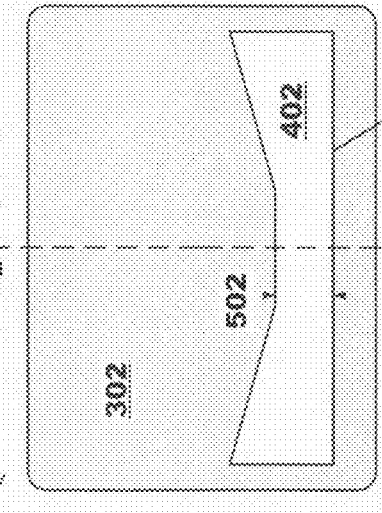
FIG. 5a is a plan view of FIG. 4 subsequent to the etching of oxide 1 in accordance with embodiments of the present invention.
Figure 5B:
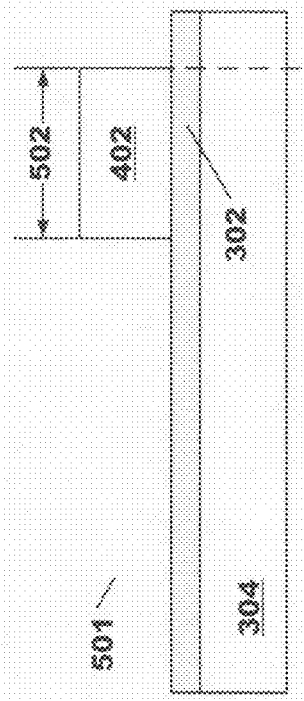
FIG. 5b is cross section view through section B-B of FIG. 5a in accordance with embodiments of the present invention.

FIG. 5a is a plan view 500 of FIG. 4 subsequent to the etching of oxide 1 layer 402 in accordance with embodiments of the present invention. FIG. 5b is cross section view through section B-B of FIG. 5a. The remaining "island" of oxide 1 layer 402 takes the shape of the wrap around shield, having a preliminary location of the Air Bearing Surface (ABS) shown as ABS (ref). This is a provisional location, as the actual ABS location will be finalized by a lapping process. Dimension 502 represents a preliminary throat height, or the thickness of the subsequently constructed shield structure (at the write pole), as measured from the ABS. In the next step, a blanket layer of second oxide, denoted oxide 2, is deposited over the structure shown in FIG. 5b.

FIG. 6 is a cross section view 600 of FIG. 5b subsequent to the blanket deposition of oxide 2 layer 602 in accordance with embodiments of the present invention. Oxide 1 and oxide 2 are chosen to have unique selectivities when undergoing a reactive ion etch (RIE) processing. That is, when oxide 1 is being etched, oxide 2 is minimally affected. Likewise, when oxide 2 is being etched, oxide 1 is minimally affected. Some examples of oxide 1/oxide 2 pairs include, but are not limited to:

I. Oxide 1: $SiO_2$; Oxide 2: $Si_3N_4$
II. Oxide 1: $SiO_2$; Oxide 2: $Al_2O_3$ For pair I, SiO2 etching is performed with carbon rich fluorocarbon gases such as $C_3F_8$ and $C_4F_8$. $Si_3N_4$ etching is performed with mixtures of $CF_4/O_2/N_2$, or $SF_6/CH_4/N_2/O_2$. When etching $SiO_2$ in the presence of $Si_3N_4$, selectivities range from 4:1 up to 30:1. When etching $Si_3N_4$ in the presence of $SiO_2$, selectivity is about 6:1. For pair II, $SiO_2$ etching is performed with mixtures of $CHF_3/CF_4$ with a $SiO_2/Al_2O_3$ selectivity of about 10:1. $Al_2O_3$ etching is performed in $BCl_3$ with a $Al_2O_3/SiO_2$ selectivity of about 10:1. Etch stop layer 302 is preferably a metal layer, comprising Ru, Rh, or Cr.

In an alternate embodiment of the present invention, pair I can be Oxide 1: $SiO_2$; Oxide 2: $Si_3N_4$. Pair 2 can be Oxide 1: $SiO_2$; Oxide 2: $Al_2O_3$. The foregoing limitations on the etch chemistries and selectivities apply.

After oxide 2 layer 602 is deposited, the structure is planarized, the steps of which are well known to those skilled in the art. This is done to remove the portions of oxide 2 layer 602 covering oxide 1 layer 402. For planarization by CMP, some of these steps (not shown) include the deposition of a CMP stop layer, planarization, and removal of the stop layer by ion milling or RIE.

FIG. 7a is a plan view 700 of FIG. 6 subsequent to the planarization of oxide 2 layer 602 in accordance with embodiments of the present invention. FIG. 7b is a cross section view 701 through section C-C of FIG. 7a. Following planarization, a blanket etch mask layer is deposited on the planarized surface.

FIG. 8 is a cross section view 800 of FIG. 7b subsequent to the blanket deposition of an etch mask layer 802 in accordance with embodiments of the present invention. Layer 802 is preferably a metal, resistant to the etch conditions used to etch oxide 2 layer 602. Layer 802 may be chosen from (but is not limited to) Ru, Rh, and Cr. A photo resist layer is then deposited on layer 802 in order to pattern the layer.

FIG. 9a is a cross section view 900 of FIG. 8 subsequent to the blanket deposition of a photo resist layer 902 in accordance with embodiments of the present invention. FIG. 9b is a plan view 901 of FIG. 9a subsequent to the patterning of mask layer 802 in accordance with embodiments of the present invention. Mask layer 802 is patterned to expose the underlying oxide layers 602 and 402 in the shape of write pole (main pole). Following this step, oxide 2 layer 602 will be selectively etched.

Figure 10:
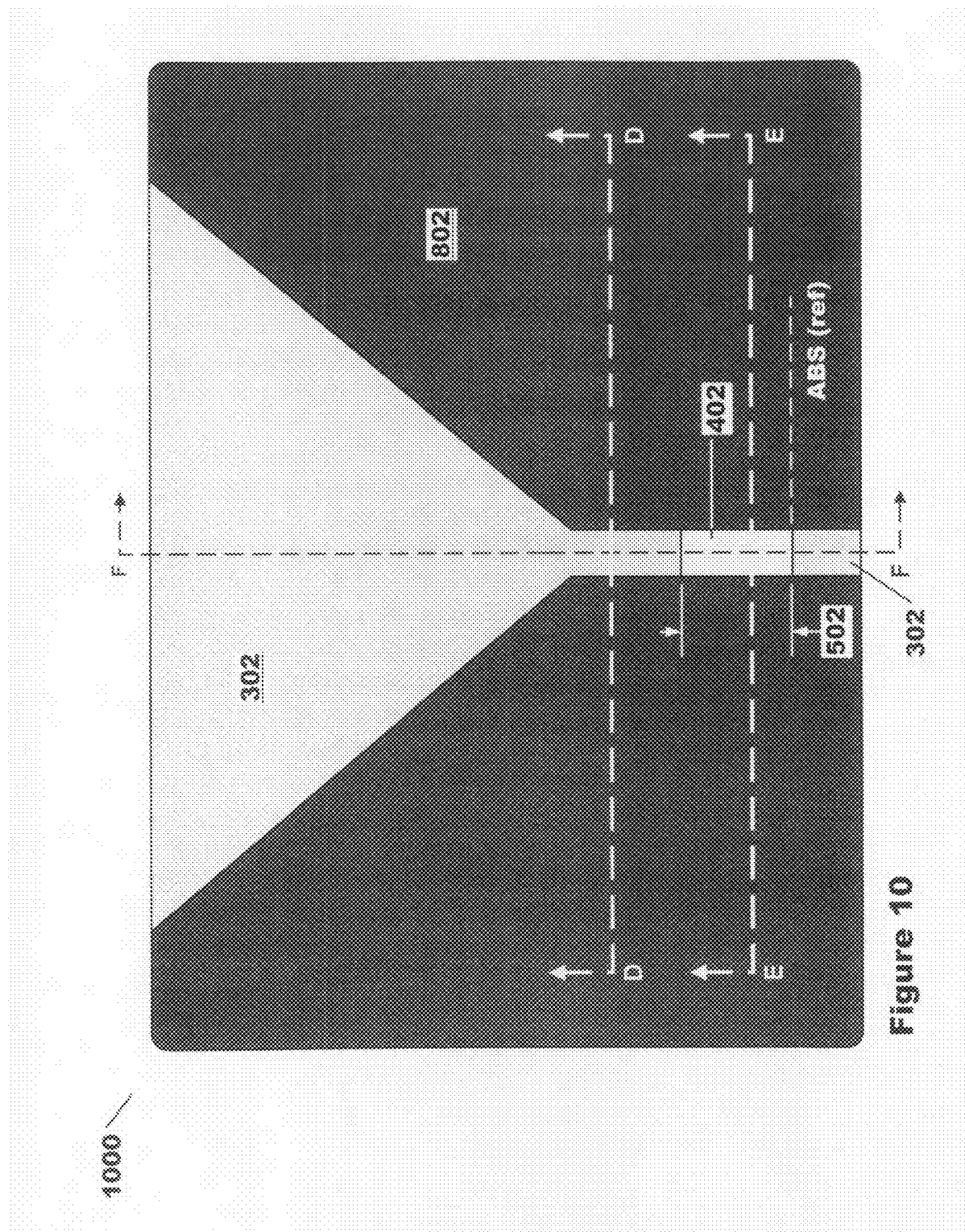
FIG. 10 is a plan view of FIG. 9b subsequent to the selective etching of oxide 2 in accordance with embodiments of the present invention.

FIG. 10 is a plan view 1000 of FIG. 9b subsequent to the selective etching of oxide 2 layer 602 in accordance with embodiments of the present invention. In the regions where oxide 2 layer 602 was etched, etch stop layer 302 is exposed. Due to the selective nature of the RIE process to etch oxide 2 layer 602, the exposed portion of oxide layer 402 is minimally etched.

FIG. 11 is a cross section view 1100 through section D-D of FIG. 10 in accordance with embodiments of the present invention. Etch conditions are chosen to create undercutting of oxide 2 layer 602 in the vicinity of open portions of mask layer 802. This creates an actual etched trench width of nominally TW' (ref 1102)+2 D (ref 1104). Typically, distance D is about 50% of mask opening TW', but can be as large as 100% of TW'. FIG. 12 is a cross section view 1200 through section E-E of FIG. 10. Since this a cross section through oxide 1 layer 402, no etching occurs even though mask layer 802 has an opening of TW' (ref 1102).

Figure 14A:
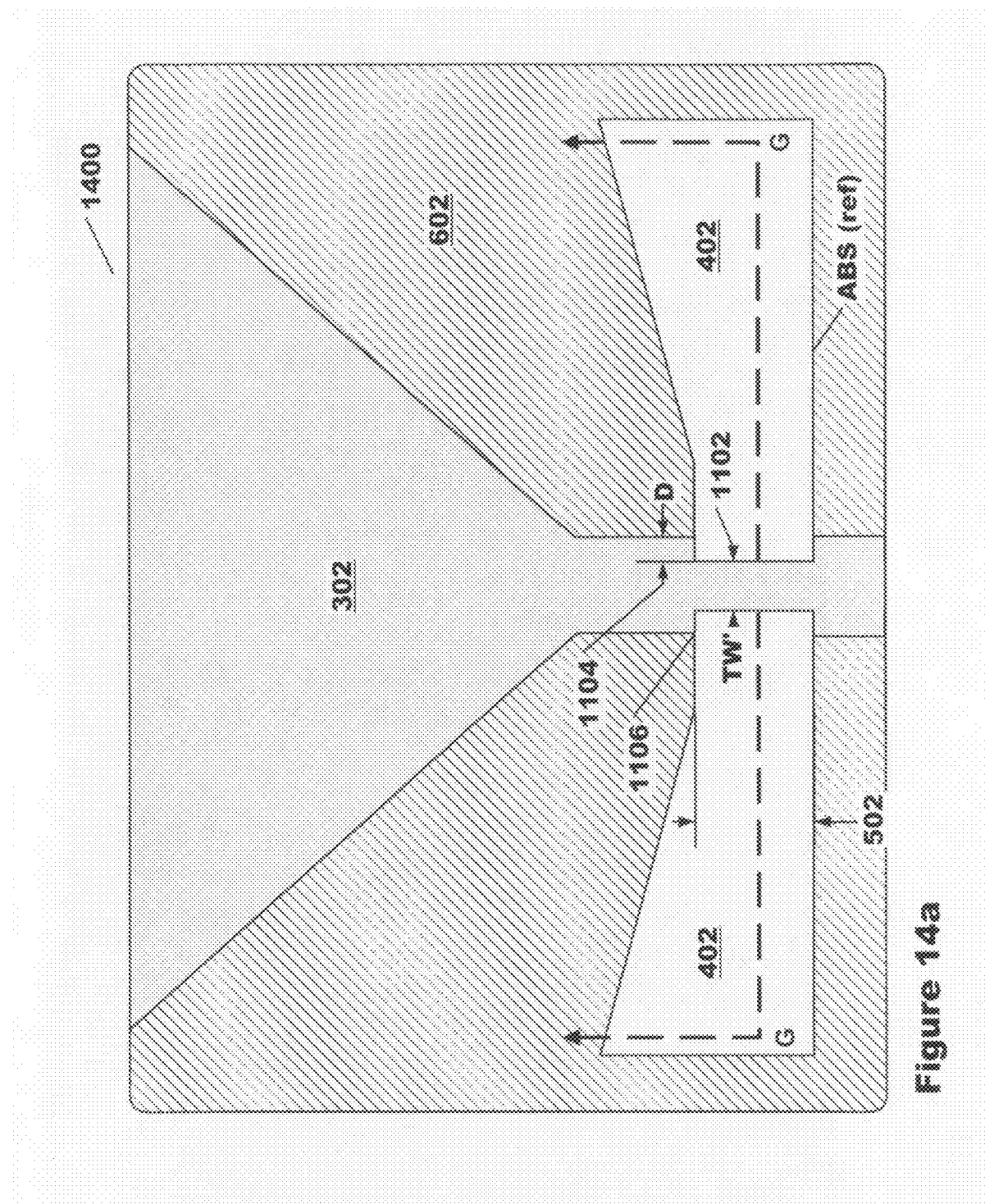
FIG. 14a is a plan view of FIG. 13 subsequent to removal of mask layer 802 in accordance with embodiments of the present invention.

FIG. 13 is a cross section view 1300 of FIG. 12 subsequent to the etching of oxide 1 layer 402 in accordance with embodiments of the present invention. Etch conditions are chosen to minimize any undercutting of oxide 1 layer 402. FIG. 14a is a plan view 1400 of FIG. 13 subsequent to removal of mask layer 802. FIG. 14b is a cross section view 1401 through section G-G of FIG. 14a. Plan view 1400 shows two different trench widths in the "neck" portion of the funnel. In the region bordered by oxide 1 layer 402, the trench has a nominal width of TW'. In the regions bordered by oxide 2 layer 602, the width of the trench is TW'+2 D. This creates a notch 1106 at the interface between oxide 1 and oxide 2. The location of this notch is determined by the original location of the oxide 1 "island" as shown in FIG. 5a, and is the result of the undercut while etching oxide 2 layer 602, relative to the etching characteristics of oxide 1 layer 402.

Figure 15:
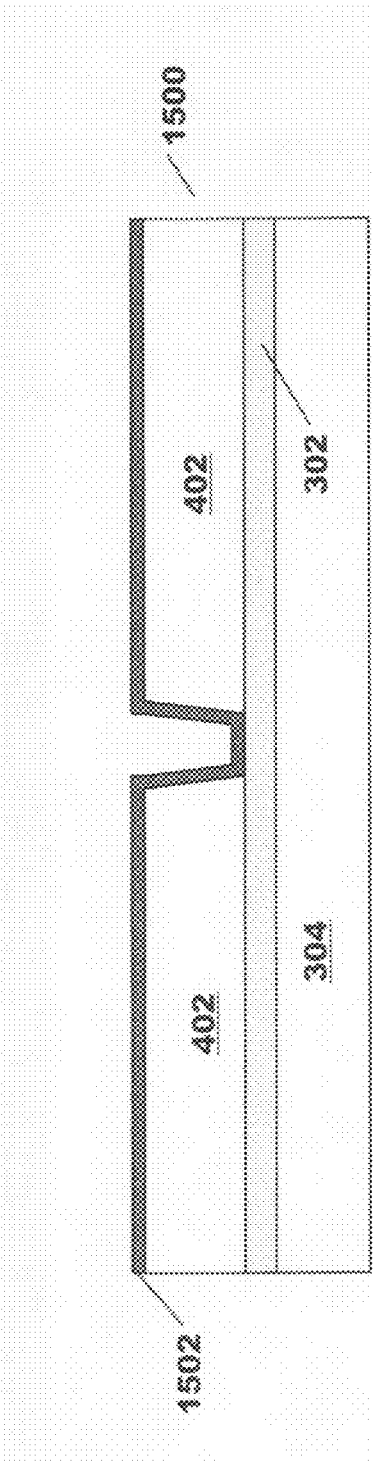
FIG. 15 is a cross section view of FIG. 14b subsequent to the blanket deposition of a plating seed layer in accordance with embodiments of the present invention.
Figure 16:
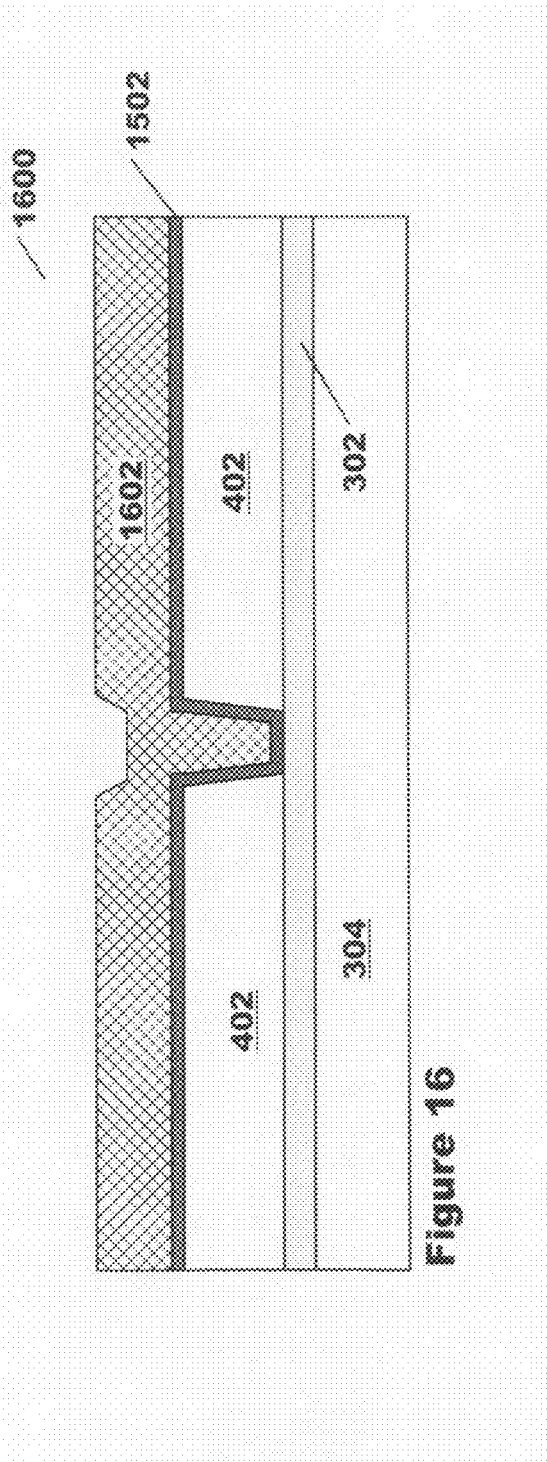
FIG. 16 is a cross section view of FIG. 15 subsequent to electroplating of magnetic pole material in accordance with embodiments of the present invention.
Figure 17:
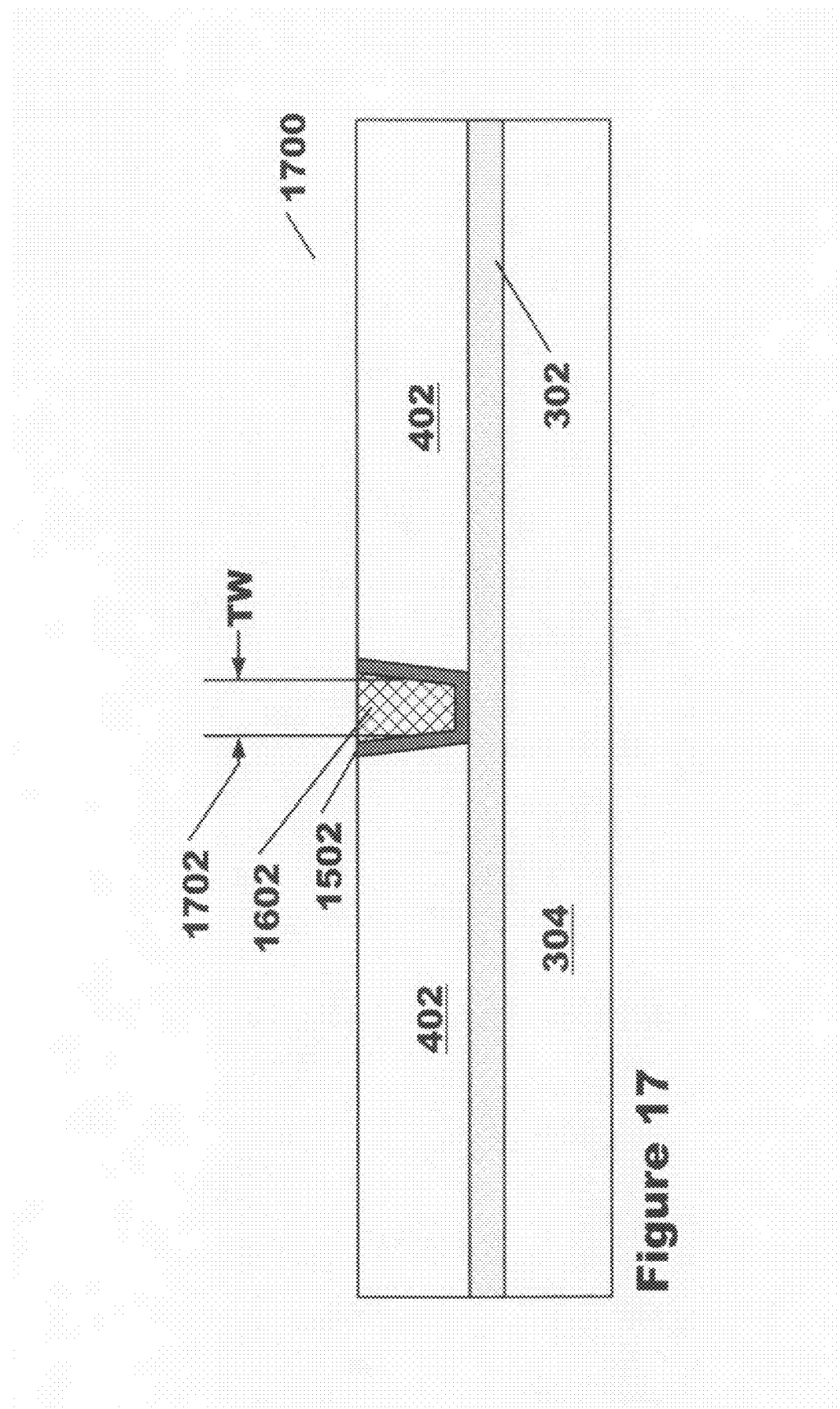
FIG. 17 is a cross section view of FIG. 16 subsequent to the planarization of the pole material in accordance with embodiments of the present invention.

FIG. 15 is a cross section view 1500 of FIG. 14b subsequent to the blanket deposition of a plating seed layer 1502 in accordance with embodiments of the present invention. FIG. 16 is a cross section view 1600 of FIG. 15 subsequent to electroplating of magnetic pole material 1602. FIG. 17 is a cross section view 1700 of FIG. 16 subsequent to the planarization of the pole material 1602. Intermediate steps (such as the deposition and removal of a CMP stop layer) have been omitted for simplicity, and are well known to those skilled in the art. Subsequent to pole material deposition, a nominal track width of TW (ref 1702) is obtained. TW is approximately the etched trench dimension TW' (ref 1102) minus two time the thickness of the plating seed layer 1502. After deposition and planarization of the pole material, the remainder of oxide 1 layer 402 is removed by RIE.

Figure 18:
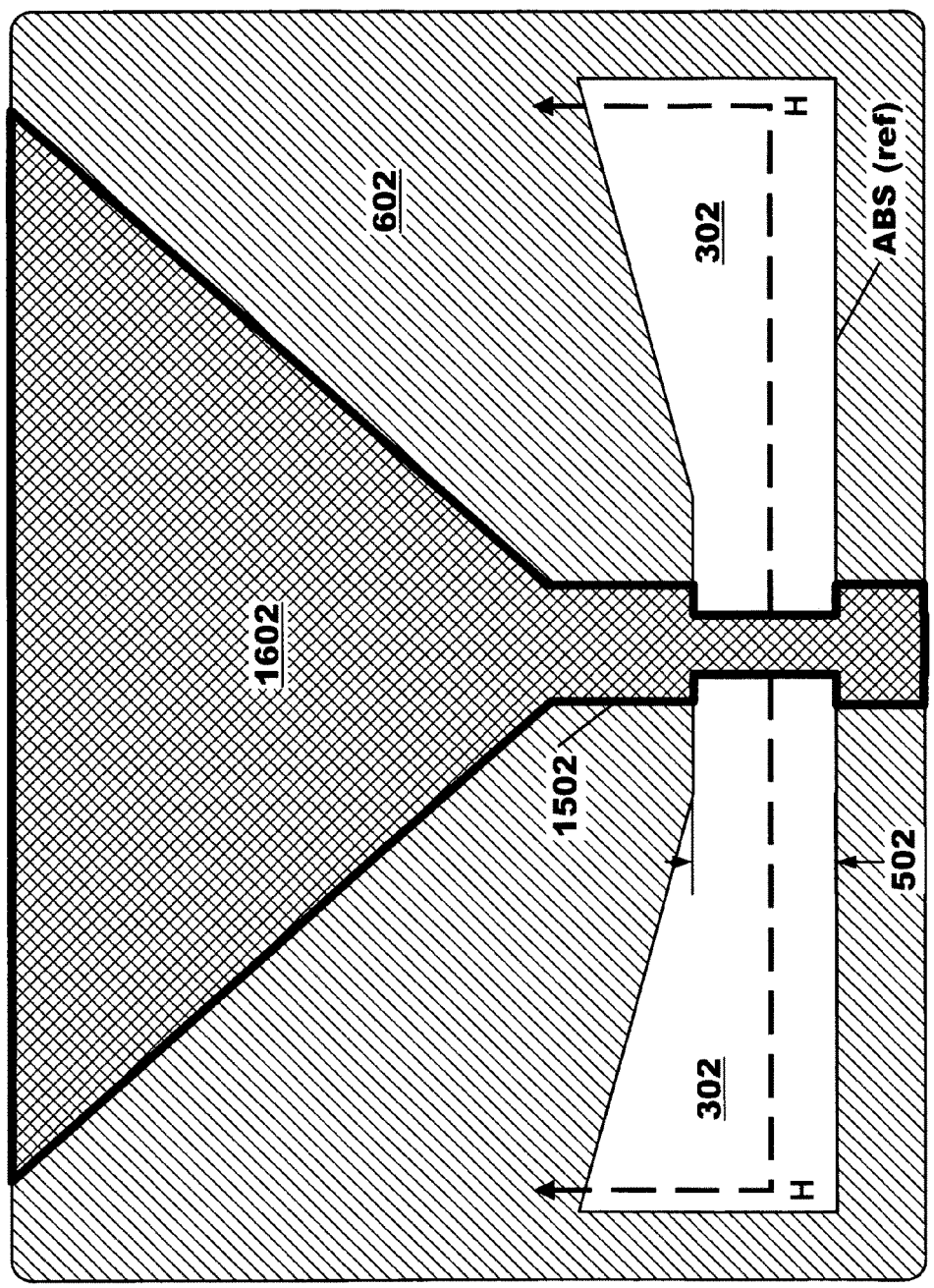
FIG. 18 is a plan view of FIG. 17 subsequent to the removal of oxide 1 in accordance with a first embodiment of the present invention.

FIG. 18 is a plan view 1800 of FIG. 17 subsequent to the removal of oxide 1 layer 402 in accordance with a first embodiment of the present invention. FIG. 19 is a cross section view 1900 through section H-H of FIG. 18. Due to the removal of oxide 1, the notched interface of pole material 1602 (covered by plating seed layer 1502) is visible. The next step in the process is the blanket deposition of the gap layer.

FIG. 20 is a cross section view 2000 of FIG. 19 subsequent to the blanket deposition of gap layer 2002 in accordance with a first embodiment of the present invention. Gap layer 2002 is preferably a non-magnetic precious metal, typically Ru or Ru, but may also be a layer material comprising a under-layer of an insulator such as alumina, and an upper layer of Ru or Rh or other precious metal. Gap layer 2002 must not only serve as the magnetic gap between the pole and the shield, but also the plating seed layer for the deposition of the shield. After deposition of the gap layer 2002, a photo resist layer is deposited. Following exposure and development, the patterned photo resist layer will act as the mask for shield plating.

Figure 21A:
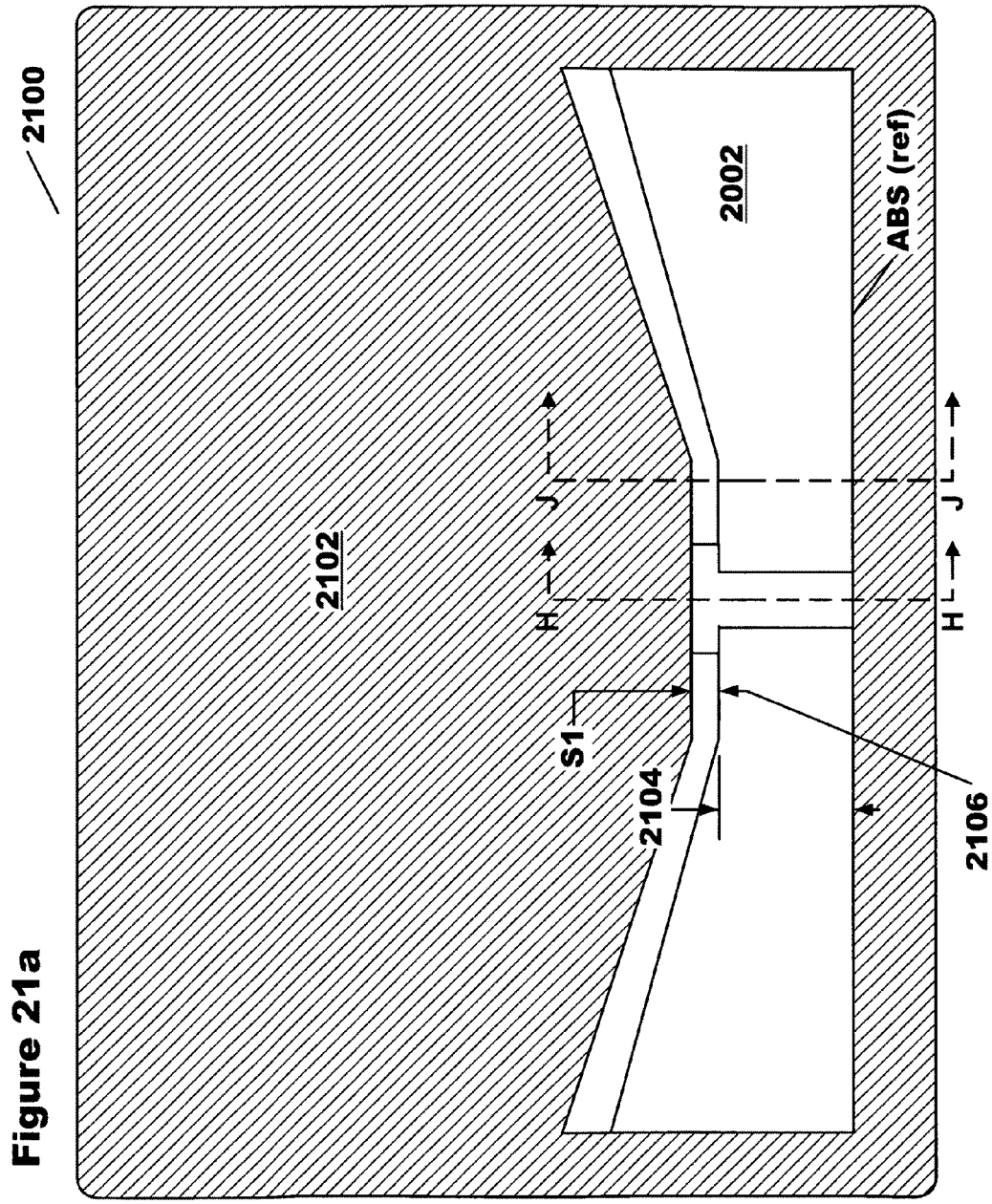
FIG. 21a is a plan view of FIG. 20 subsequent to the deposition, imaging and development of photo resist layer 2102 in accordance with a first embodiment of the present invention.

FIG. 21a is a plan view 2100 of FIG. 20 subsequent to the deposition, imaging and development of photo resist layer 2102 in accordance with a first embodiment of the present invention. FIG. 21b is a cross section view through section H-H of FIG. 21a. FIG. 21c is a cross section view through section J-J of FIG. 21a. Photo resist layer 2102 is patterned to produce an opening recessed back from the cavities in oxide layer 602 by distance S1 (ref 2106). The width of the cavity subsequent the deposition of the gap layer is dimension 2104, which is approximately equal to dimension 502 minus 2 times the thickness of gap layer 2002. The cavity bounded by layers 602/2002, 1602/2002, and photo resist layer 2102 is then filled with magnetic alloy material by electroplating, utilizing gap layer 2002 as a seed layer. The resulting deposit of magnetic material forms the wrap around shield structure. Subsequent to shield plating, photo resist layer 2102 is removed, a blanket oxide layer deposited, and the entire structure planarized. Details of these processes have been omitted for clarity, but are well known to those skilled in the art.

FIG. 22a,b are cross section views 2200, 2201 of FIG. 21b,c, respectively, subsequent to shield 2204 deposition in accordance with a first embodiment of the present invention. Photo resist layer 2102 has been removed and replaced with filler oxide layer 2202, typically Al2O3. Subsequent to shield formation, the structure is lapped to form the precise location of the ABS, which then determines the throat height of the shield.

FIGS. 23a,b are cross section views 2300, 2301 of FIGS. 22a,b, respectively, subsequent to lapping in accordance with a first embodiment of the present invention. Following the lapping process, the location of the ABS is finalized. Note that the shield 2204 has a stepped structure in regions on either side of the pole 1602. These regions are referred to as the side shield. Above the pole layer 1602, the shield has a depth (as measured from the ABS) of $W_1$ and a thickness Hal equal approximately to the thickness of filler oxide layer 2202. In the side shield regions, the lower portion of the shield adjacent to the pole has a depth equal to the throat height $TH_1$ (ref 2302), and a depth above the pole layer 1602 equal to $TH_1$ plus dimension S1 (ref 2106). The stepped structure aids in balancing the performance characteristics of the wrap around shield, such as improving saturation without reducing write pole signal strength.

Figure 24:
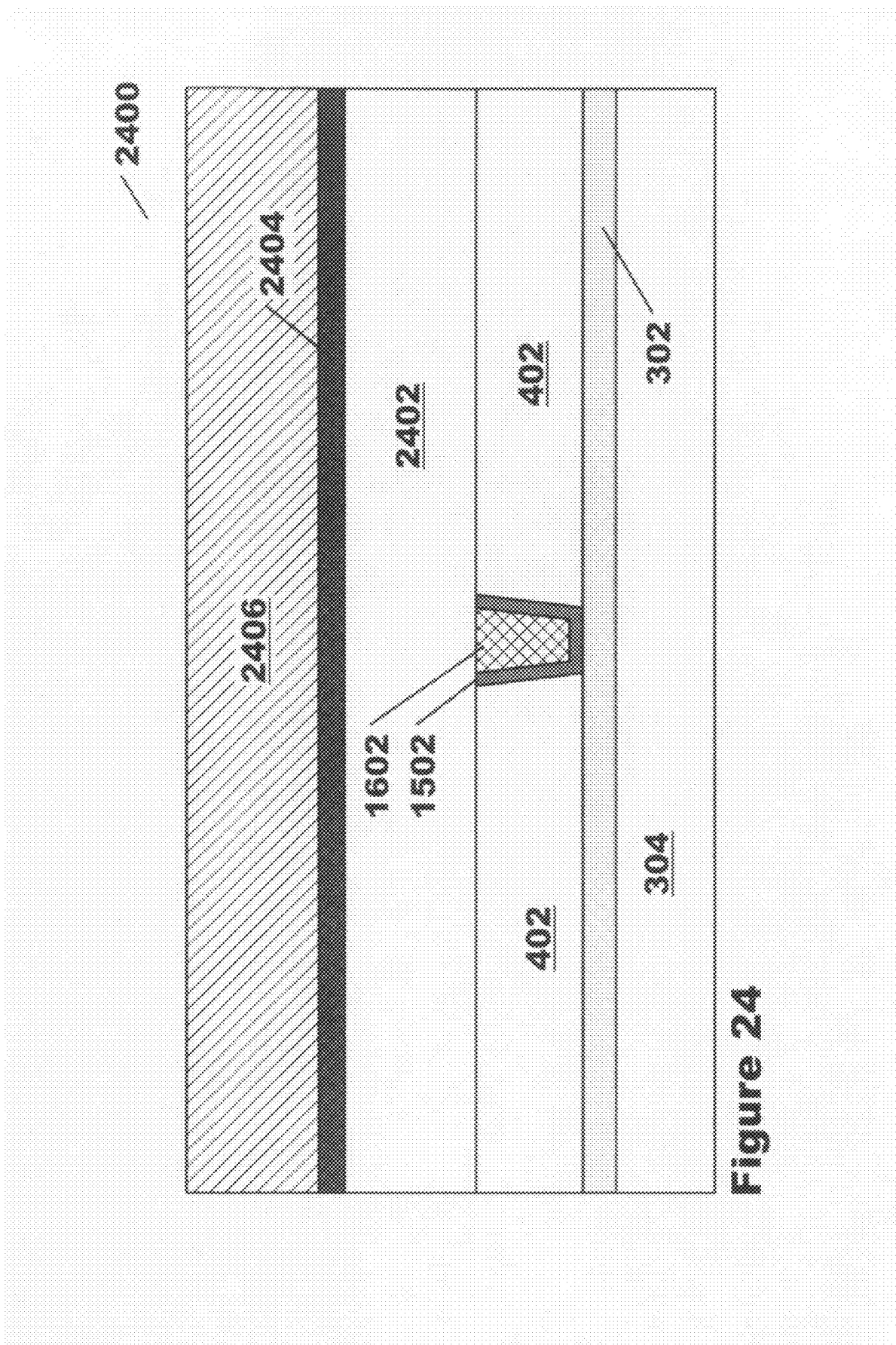
FIG. 24 is a cross section view of FIG. 17 subsequent to blanket deposition of a second oxide 1 layer 2402, mask layer 2404 and photo resist layer 2406 in accordance with a second embodiment of the present invention.

Returning to the process at FIG. 17, FIG. 24 is a cross section view 2400 of FIG. 17 subsequent to blanket deposition of a second oxide 1 layer 2402, etch mask layer 2404 and photo resist layer 2406 in accordance with a second embodiment of the present invention. FIG. 25a is a plan view of FIG. 24 subsequent to the patterning of mask layer 2404 and removal of a portion of oxide 1 layer 2402, and the remaining sections of oxide 1 layer 402, by RIE. The intermediate steps of imaging, developing, and removing photo resist layer 2406 have been omitted for clarity, but are self evident to those skilled in the art. The opening in patterned mask layer 2404 is recessed back from the cavities that contained oxide layer 402 by a dimension 2502, exposing an underlying portion of oxide 2 layer 602.

Figure 25B:
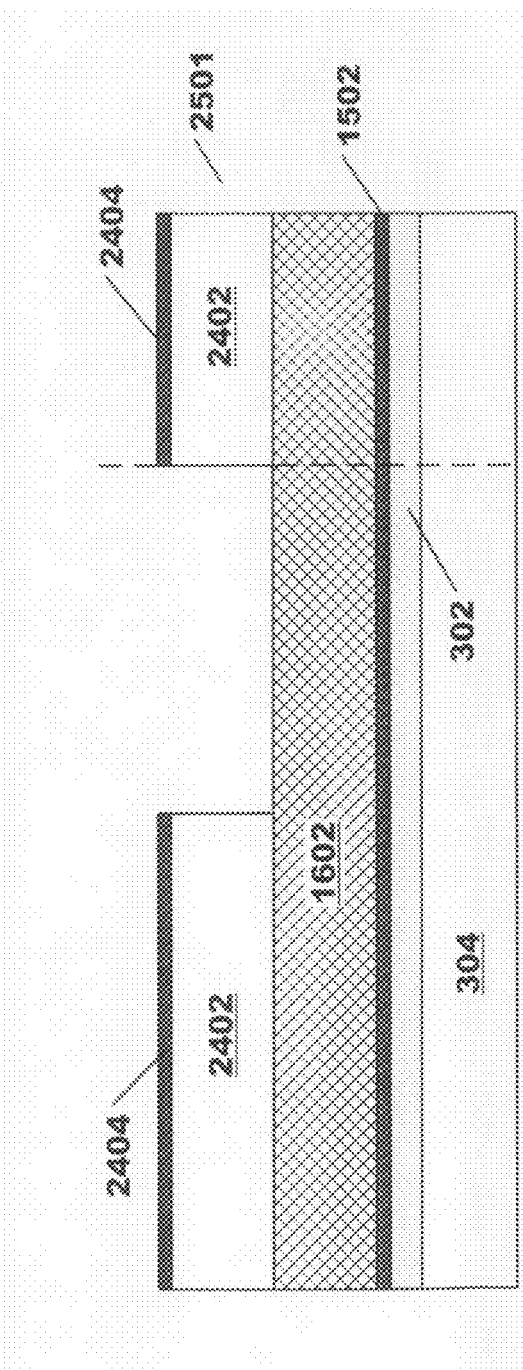
FIG. 25b is a cross section view through section K-K of FIG. 25a in accordance with a second embodiment of the present invention.
Figure 25C:
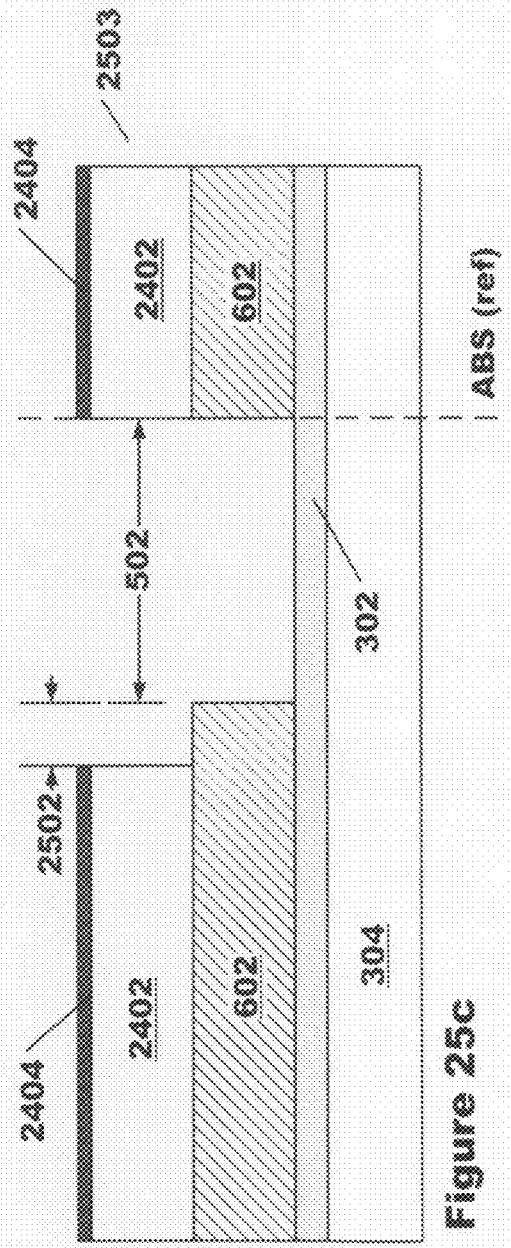
FIG. 25c is a cross section view through section L-L of FIG. 25a in accordance with a second embodiment of the present invention.
Figures 26A, 26B:
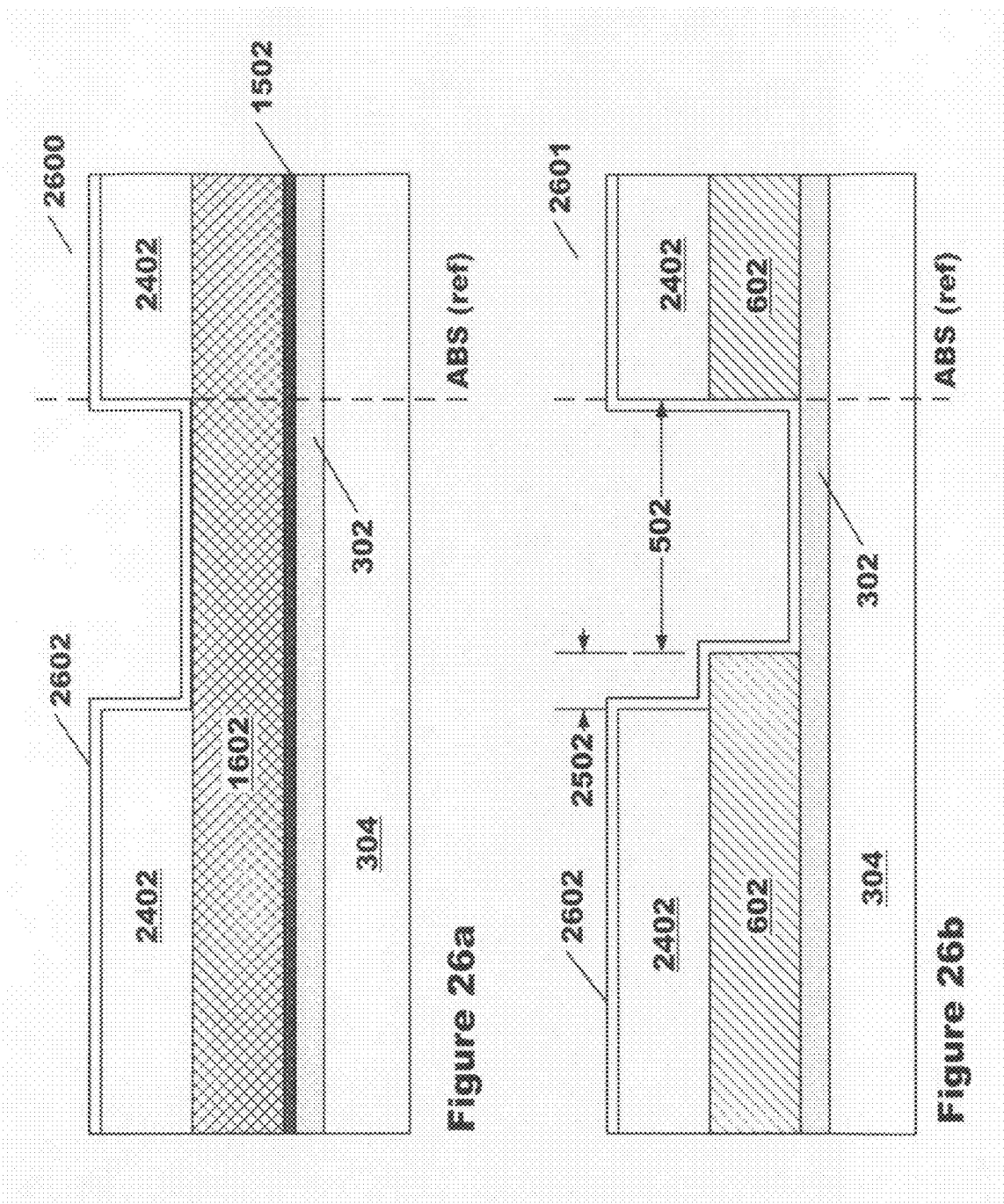
FIGS. 26a,b are cross section views of FIG. 25b,c, respectively, subsequent to the removal of mask layer 2404 and deposition of gap layer 2602 in accordance with a second embodiment of the present invention.

FIG. 25b is a cross section view 2501 through section K-K of FIG. 25a in accordance with a second embodiment of the present invention. FIG. 25c is a cross section view 2503 through section L-L of FIG. 25a. FIGS. 26a,b are cross section views 2600, 2601 of FIG. 25b,c, respectively, subsequent to the removal of mask layer 2404 and deposition of gap layer 2602 in accordance with a second embodiment of the present invention. Gap layer 2602 is preferably a non-magnetic precious metal, typically Ru or Ru, but may also be a layer material comprising a under-layer of an insulator such as alumina, and an upper layer of Ru or Rh or other precious metal. Gap layer 2602 must not only serve as the magnetic gap between the pole and the shield, but also the plating seed layer for the deposition of the shield. After deposition of the gap layer 2602, a photo resist layer is deposited. Following exposure and development, the patterned photo resist layer will act as the mask for shield plating.

Figures 27A, 27B:
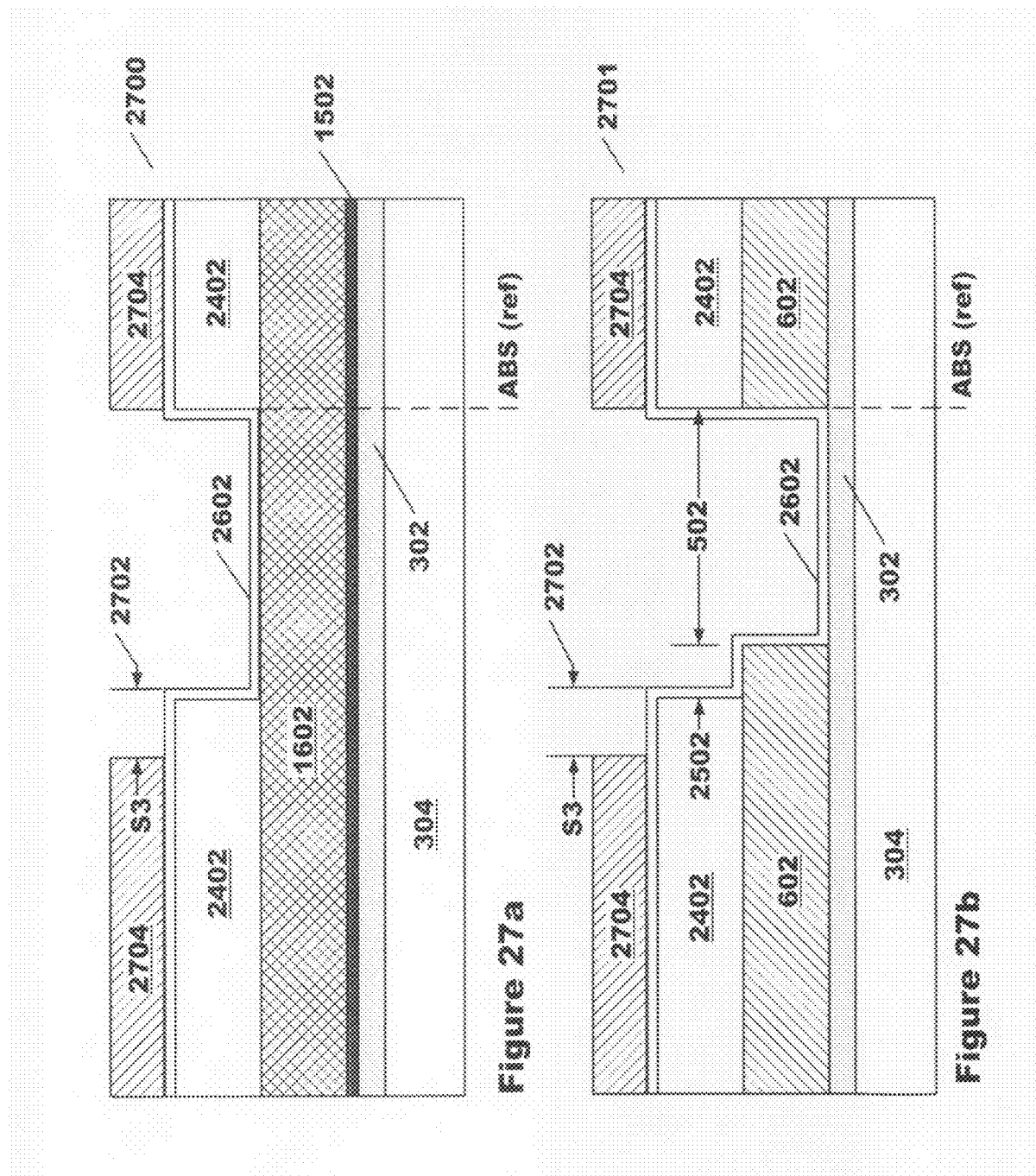
FIGS. 27a,b are cross section views of FIG. 26a,b, respectively, subsequent to the deposition, imaging, and development of photo resist layer 2704 in accordance with a second embodiment of the present invention.

FIGS. 27a,b are cross section views 2700, 2701 of FIG. 26a,b, respectively, subsequent to the deposition, imaging, and development of photo resist layer 2704 in accordance with a second embodiment of the present invention. Dimension S3 (ref 2702) is equal to dimension 2502 plus the thickness of gap layer 2602.

FIGS. 28a,b are cross section views 2800, 2801 of FIGS. 27a,b, respectively, subsequent to the deposition of shield layer 2802 and deposition of filler oxide 2804 in accordance with a second embodiment of the present invention. Steps involving the planarization of filler oxide layer 2804 have been omitted for clarity, but are well known to those skilled in the art.

FIG. 29a,b are cross section views 2900, 2901 of FIGS. 28a,b, respectively, subsequent to lapping in accordance with a second embodiment of the present invention. In this embodiment of the present invention, the addition of another oxide 1 layer 2402 creates an additional "step" in the wrap around shield structure. Thus, a stepped shield is created directly over the pole layer 1602 (FIG. 29a) having a lower depth of $W1_2$ (ref 2908) and an upper depth of $W2_2$ (ref 2902), as measured from the ABS. In the side shield regions shown in FIG. 29b, a dual stepped structure is created, wherein the lower portion has a depth equal to the throat height $TH_2$ (ref 2910), a middle portion having a depth of $W1_2$ (ref 2908), and an upper portion having a depth of $W2_2$, all measured from the ABS. Dimension S2 (ref 2906) is equal to $W1_2$ minus throat height $TH_2$. The addition of another "step" in the structure of the wrap around shield, further improves saturation characteristics and write pole performance over that of the first embodiment of the present invention.

FIG. 30 is a plan view 3000 of the finished structure of FIGS. 29a,b and 23a,b in accordance with the first and second embodiments of the present invention. Filler oxide layer 3004 is equivalent to oxide layer 2202 of the first embodiment and 2804 in the second embodiment. Dimension W (ref 3002) is equivalent to $W_1$ (ref 2306) of the first embodiment and $W2_2$ (ref 2902) of the second embodiment.

FIG. 31 is a cross section view 3100 through section M-M of FIG. 30 in accordance with the first and second embodiments of the present invention. This also the view looking into the structure from the ABS. Gap layer 3106 is equivalent to gap layer 2002 of the first embodiment and 2602 of the second embodiment. Wrap around shield 3006 corresponds to shield layers 2204 and 2802 of the first and second embodiments, respectively.

FIG. 32 is a plan view 3200 through section N-N of FIG. 31 in accordance with the first and second embodiments of the present invention. Throat height TH (ref 3202) is equivalent to $TH_1$ (ref 2302) of the first embodiment and $TH_2$ (ref 2910) of the second embodiment. The structure shows some unique advantages of the present invention. Firstly, there are two "flare points", one located at a distance $FP_1$ (ref 3204) from the ABS, and another located at a distance $FP_2$ (ref 3206) from the ABS. The flare point located at $FP_1$ has the dominant impact on the magnetic properties of the write head. $FP_2$ has a secondary impact on the properties. The flare point at $FP_1$ is accurately located with respect to the ABS and the throat height TH of the shield due to the self aligned process used in fabrication. The structure also allows control of TW (ref 1702) independent of the location of the flare point at $FP_1$. The TW is primarily determined by lithography and the REI etch performance of oxide 1, whereas the location of the flare point at $FP_1$ is primarily determined by the interface between oxide 1 and oxide 2 (see FIG. 7a,b), and the thickness of plating seed layer 1502 (FIG. 15).

The present invention is not limited by the previous embodiments heretofore described. Rather, the scope of the present invention is to be defined by these descriptions taken together with the attached claims and their equivalents.

What is claimed is:

1. A thin film perpendicular magnetic head comprising
a write pole having a first flare point and a second flare point,
said write pole having a first portion extending from an air bearing surface to said first flare point, said first portion having a constant first width,
said write pole having a second portion extending from said first flare point to said second flare point, said second portion having a constant second width greater than said first width, and
said write pole having a third portion extending from said second flare point in a direction away from said air bearing surface, said third portion having a width that increases linearly in proportion to a distance from said second flare point.

2. The magnetic head as recited in claim 1, wherein said first width is approximately equal to a track width of said write pole.

3. The magnetic head as recited in claim 2, wherein said second width is less than or equal to said track width plus dimension 2D.

4. The magnetic head as recited in claim 1, further comprising a shield structure having a throat height $TH_1$, and a depth above said write pole of dimension $W_1$, wherein said depth $W_1$ is greater than said throat height $TH_1$.

5. The magnetic head as recited in claim 4, wherein said first flare point is located at a dimension $FP_1$ from said air bearing surface, and said depth $W_1$ is greater than said dimension $FP_1$.

6. The magnetic head as recited in claim 4, wherein said first flare point is located at a dimension $FP_1$ from said air bearing surface, said dimension $FP_1$ being essentially equal to said throat height $TH_1$ plus the thickness of a first layer and a second layer, said first layer comprising a plating seed layer, said second layer comprising a non-magnetic gap layer.

7. The magnetic head as recited in claim 1, further comprising a shield structure having
a throat height $TH_2$,
a first portion, immediately above said write pole, having a depth of dimension $W1_2$,
a second portion, immediately above said first portion, having a depth of dimension $W2_2$,
wherein, said depth $W1_2$ is greater than said throat height $TH_2$, and said depth $W2_2$ is greater than said depth $W1_2$.

8. The magnetic head as recited in claim 7, wherein said first flare point is located at a dimension $FP_1$ from said air bearing surface, and said depth $W1_2$ is greater than said dimension $FP_1$.

9. The magnetic head as recited in claim 7, wherein said first flare point is located at a dimension $FP_1$ from said air bearing surface, and said depth $W2_2$ is greater than said dimension $FP_1$.

10. The magnetic head as recited in claim 7, wherein said first flare point is located at a dimension $FP_1$ from said air bearing surface, said dimension $FP_1$ being essentially equal to said throat height $TH_2$ plus the thickness of a first layer and a second layer, said first layer comprising a plating seed layer, said second layer comprising a non-magnetic gap layer.

* * * * *